United States Patent
Marusic et al.

(10) Patent No.: US 12,065,236 B2
(45) Date of Patent: Aug. 20, 2024

(54) SYSTEMS AND METHODS FOR ACTIVE CONTROL OF SURFACE DRAG USING INTERMITTENT OR VARIABLE ACTUATION

(71) Applicant: Deep Science, LLC, Bellevue, WA (US)

(72) Inventors: Ivan Marusic, Essendon (AU); Alexander J. Smits, Princeton, NJ (US); David William Wine, Seattle, WA (US)

(73) Assignee: Enterprise Science Fund, LLC, Bellevue, WA (US)

( * ) Notice: Subject to any disclaimer, the term of this patent is extended or adjusted under 35 U.S.C. 154(b) by 86 days.

(21) Appl. No.: 17/786,417

(22) PCT Filed: Jan. 21, 2021

(86) PCT No.: PCT/US2021/014417
§ 371 (c)(1),
(2) Date: Jun. 16, 2022

(87) PCT Pub. No.: WO2021/150755
PCT Pub. Date: Jul. 29, 2021

(65) Prior Publication Data
US 2023/0012961 A1 Jan. 19, 2023

Related U.S. Application Data

(60) Provisional application No. 62/965,077, filed on Jan. 23, 2020.

(51) Int. Cl.
*B64C 23/00* (2006.01)
*B64C 21/04* (2023.01)

(52) U.S. Cl.
CPC ............ *B64C 23/005* (2013.01); *B64C 21/04* (2013.01); *B64C 2230/06* (2013.01); *B64C 2230/12* (2013.01)

(58) Field of Classification Search
CPC .............. B64C 23/005; B64C 2230/06; B64C 2230/12; B64C 21/04; B64C 2230/04;
(Continued)

(56) References Cited

U.S. PATENT DOCUMENTS

| | | | |
|---|---|---|---|
| 1,903,823 A | | 4/1933 | Lougheed |
| 2,440,198 A | * | 4/1948 | Green ................. G01L 19/0007 73/147 |

(Continued)

FOREIGN PATENT DOCUMENTS

| | | |
|---|---|---|
| CN | 103410680 A | 11/2013 |
| CN | 103925152 A | 7/2014 |

(Continued)

OTHER PUBLICATIONS

Stroh, "Reactive Control of Turbulent Wall-Bounded Flows for Skin Friction Drag Reduction", XP055677081, Karlsruher Institut fur Technologie (KIT}, KI, Dec. 11, 2015 (Dec. 11, 2015}, pp. 1-214.

(Continued)

*Primary Examiner* — Medhat Badawi
(74) *Attorney, Agent, or Firm* — PCFB, LLC; Justin K. Flanagan

(57) ABSTRACT

A system includes a surface, an actuator, and processing circuitry. The surface includes one or more non-actuating zones and one or more actuatable zones. The actuator is configured to a flow property of a fluid that flows over the one or more actuatable zones of the surface. The processing circuitry is configured to obtain a value of a parameter of the fluid that flows over the surface, and operate the actuator to adjust the flow property of the fluid that flows over the one (Continued)

or more actuatable zones based on the value of the parameter of the fluid.

33 Claims, 9 Drawing Sheets

(58) Field of Classification Search
CPC ...... F15D 1/0065; F15D 1/007; F15D 1/0075; F15D 1/008; F15D 1/12; Y02T 50/10
See application file for complete search history.

(56) References Cited

U.S. PATENT DOCUMENTS

| | | | | |
|---|---|---|---|---|
| 3,079,106 A * | 2/1963 | Whitnah | B64B 1/60 | 244/30 |
| 3,095,163 A | 6/1963 | Hill | | |
| 3,209,714 A * | 10/1965 | Bowles | B63B 1/288 | 114/277 |
| 3,289,978 A * | 12/1966 | Banaszak | B64C 21/06 | 244/204.1 |
| RE26,434 E * | 8/1968 | Bowles | F15C 1/006 | 114/277 |
| 3,488,019 A * | 1/1970 | Sonstegaard | B64B 1/00 | 244/128 |
| 3,578,264 A * | 5/1971 | Kuethe | F28F 1/32 | 181/220 |
| 3,599,901 A * | 8/1971 | Relkin | B64C 29/00 | 244/12.3 |
| 3,620,485 A * | 11/1971 | Egon Gelhard | B64B 1/00 | 244/128 |
| 3,779,199 A * | 12/1973 | Mayer, Jr. | B63B 1/36 | 440/38 |
| 3,951,360 A * | 4/1976 | Anxionnaz | B64C 21/06 | 244/209 |
| 4,102,519 A * | 7/1978 | Crosby, Jr. | B64B 1/42 | 244/33 |
| 4,309,901 A * | 1/1982 | Rolinski | G01M 9/06 | 73/147 |
| 4,516,747 A * | 5/1985 | Lurz | B64C 23/00 | 244/130 |
| 4,526,031 A * | 7/1985 | Weisend, Jr. | B64D 15/20 | 73/147 |
| 4,611,492 A * | 9/1986 | Koosmann | G01W 1/00 | 73/590 |
| 4,750,693 A * | 6/1988 | Lobert | F15D 1/0045 | 244/130 |
| 4,802,642 A | 2/1989 | Mangiarotty | | |
| 4,932,612 A * | 6/1990 | Blackwelder | B64C 21/04 | 244/209 |
| 5,037,044 A * | 8/1991 | Seyfang | B64C 23/06 | 244/200.1 |
| 5,106,017 A * | 4/1992 | Hicks | B26F 1/14 | 83/13 |
| 5,209,438 A * | 5/1993 | Wygnanski | B64C 23/00 | 244/200.1 |
| 5,359,574 A * | 10/1994 | Nadolink | B63G 8/34 | 367/1 |
| 5,365,490 A * | 11/1994 | Katz | B64C 23/00 | 367/1 |
| 5,369,345 A * | 11/1994 | Phan | G11B 5/596 | |
| 5,374,011 A * | 12/1994 | Lazarus | B64G 1/36 | 244/76 R |
| 5,445,346 A * | 8/1995 | Gilbert | B64C 23/06 | 244/221 |
| 5,531,407 A * | 7/1996 | Austin | B64C 3/48 | 244/219 |
| 5,540,406 A * | 7/1996 | Occhipinti | B64C 21/10 | 244/200.1 |
| 5,558,156 A * | 9/1996 | Tsutsui | F28F 13/02 | 165/122 |
| 5,558,304 A * | 9/1996 | Adams | B64D 15/00 | 244/134 A |
| 5,573,012 A * | 11/1996 | McEwan | A61B 5/0809 | 600/595 |
| 5,598,990 A * | 2/1997 | Farokhi | B64C 23/06 | 296/180.1 |
| 5,755,408 A * | 5/1998 | Schmidt | B64C 21/08 | 244/130 |
| 5,808,210 A * | 9/1998 | Herb | G01L 9/002 | 73/704 |
| 5,823,468 A * | 10/1998 | Bothe | B64B 1/34 | 244/209 |
| 5,874,671 A * | 2/1999 | Lopez | G01D 11/30 | 73/178 R |
| 5,901,928 A * | 5/1999 | Raskob, Jr. | B64C 21/10 | 244/130 |
| 5,938,404 A * | 8/1999 | Domzalski | B64C 23/04 | 416/42 |
| 5,941,481 A * | 8/1999 | Snarski | B64C 21/00 | 244/130 |
| 5,942,682 A * | 8/1999 | Ghetzler | G01M 9/06 | 73/147 |
| 5,953,773 A * | 9/1999 | Asada | A61B 5/055 | 5/81.1 R |
| 5,957,413 A * | 9/1999 | Glezer | B64G 1/40 | 257/E23.093 |
| 5,961,080 A * | 10/1999 | Sinha | B64D 43/02 | 244/130 |
| 5,964,433 A * | 10/1999 | Nosenchuck | B64C 23/005 | 244/130 |
| 5,975,462 A * | 11/1999 | Platzer | B64C 19/02 | 244/11 |
| 5,988,522 A | 11/1999 | Glezer et al. | | |
| 5,988,568 A * | 11/1999 | Drews | B64C 21/10 | 296/180.1 |
| 6,016,286 A * | 1/2000 | Olivier | B63B 21/66 | 367/16 |
| 6,024,119 A * | 2/2000 | Kirschner | B63B 1/36 | 114/67 R |
| 6,092,766 A * | 7/2000 | LaRoche | F15D 1/12 | 244/200 |
| 6,109,565 A * | 8/2000 | King, Sr. | B64C 3/141 | 244/207 |
| 6,123,145 A * | 9/2000 | Glezer | H01L 23/4336 | 257/E23.093 |
| 6,123,296 A * | 9/2000 | Mangalam | B64C 21/10 | 244/206 |
| 6,131,853 A * | 10/2000 | Bauer | F42B 10/62 | 482/13 |
| 6,215,221 B1 * | 4/2001 | Cabuz | B64C 13/48 | 310/309 |
| 6,224,016 B1 * | 5/2001 | Lee | B64B 1/14 | 244/30 |
| 6,332,593 B1 * | 12/2001 | Kamiadakis | B64C 23/005 | 244/130 |
| 6,412,732 B1 * | 7/2002 | Amitay | B64C 23/005 | 244/200 |
| 6,443,394 B1 * | 9/2002 | Weisend, Jr. | B64D 15/166 | 244/134 A |
| 6,457,654 B1 * | 10/2002 | Glezer | F16K 99/0048 | 257/E23.093 |
| 6,484,971 B2 | 11/2002 | Layukallo | | |
| 6,644,598 B2 * | 11/2003 | Glezer | B64C 23/00 | 244/200 |
| 6,662,647 B2 * | 12/2003 | Schoess | G01P 13/025 | 73/170.02 |
| 6,795,763 B2 * | 9/2004 | Yao | B62D 6/008 | 701/44 |
| 6,821,090 B1 * | 11/2004 | Hassan | B64C 27/467 | 416/42 |
| 6,837,465 B2 * | 1/2005 | Lisy | B64C 23/06 | 244/204.1 |
| 6,862,502 B2 * | 3/2005 | Peltz | H04W 36/302 | 701/19 |
| 6,871,816 B2 | 3/2005 | Nugent et al. | | |
| 6,874,748 B2 * | 4/2005 | Hanagan | E04F 15/22 | 52/167.6 |

(56) References Cited

U.S. PATENT DOCUMENTS

| | | | |
|---|---|---|---|
| 6,966,231 B2* | 11/2005 | Sheplak | H01L 21/76898 73/861 |
| 6,979,050 B2* | 12/2005 | Browne | B62D 35/00 296/180.1 |
| 7,031,871 B2* | 4/2006 | Severson | G01K 13/02 374/E13.006 |
| 7,070,850 B2* | 7/2006 | Dietz | F15D 1/12 428/167 |
| 7,133,785 B2* | 11/2006 | Larson | G01F 1/68 700/282 |
| 7,204,731 B2* | 4/2007 | Gusler | B63H 19/00 416/82 |
| 7,251,592 B1* | 7/2007 | Praisner | G06F 30/23 703/2 |
| 7,264,202 B2* | 9/2007 | Sullivan | B64B 1/32 244/96 |
| 7,375,911 B1* | 5/2008 | Li | G11B 5/483 360/78.12 |
| 7,380,756 B1 | 6/2008 | Enloe et al. | |
| 7,434,170 B2* | 10/2008 | Novak | G06F 16/48 715/833 |
| 7,537,182 B2* | 5/2009 | Greenblatt | B64C 21/06 137/831 |
| 7,703,839 B2 | 4/2010 | McKnight et al. | |
| 7,854,467 B2* | 12/2010 | McKnight | B64C 23/00 296/180.1 |
| 7,891,603 B2* | 2/2011 | Voorhees | B64B 1/22 244/30 |
| 7,913,928 B2 | 3/2011 | Tiliakos et al. | |
| 7,954,768 B1 | 6/2011 | Patel | |
| 8,006,939 B2* | 8/2011 | McClure | F15D 1/12 244/130 |
| 8,074,938 B2* | 12/2011 | Hyde | B64C 21/10 244/130 |
| 8,074,939 B2 | 12/2011 | Hyde et al. | |
| 8,091,950 B2* | 1/2012 | Corke | H05H 1/2439 296/180.1 |
| 8,235,072 B2 | 8/2012 | Roy | |
| 8,267,355 B1* | 9/2012 | Patel | F42B 10/38 244/3.21 |
| 8,286,909 B2* | 10/2012 | Lee | B64B 1/30 244/65 |
| 8,308,112 B2* | 11/2012 | Wood | H05H 1/2439 244/203 |
| 8,382,043 B1 | 2/2013 | Raghu | |
| 8,436,509 B1* | 5/2013 | Branch | G01N 29/022 310/313 R |
| 8,473,122 B2* | 6/2013 | Simon | F15D 1/10 244/133 |
| 8,640,995 B2* | 2/2014 | Corke | B64C 23/005 244/205 |
| 8,783,337 B2 | 7/2014 | Hyde et al. | |
| 8,794,574 B2* | 8/2014 | Lang | F15D 1/0045 244/200.1 |
| 8,894,019 B2* | 11/2014 | Alvi | B64D 33/02 244/200.1 |
| 8,899,514 B2* | 12/2014 | Goelet | B64B 1/16 244/30 |
| 9,002,484 B2 | 4/2015 | Hyde et al. | |
| 9,410,527 B2* | 8/2016 | Hsu | F03D 5/00 |
| 9,541,106 B1 | 1/2017 | Patel | F15D 1/0075 |
| 9,640,995 B2* | 5/2017 | Thorburn | H02J 3/32 |
| 9,688,395 B2* | 6/2017 | Moffitt | B64C 27/82 |
| 9,714,083 B2* | 7/2017 | Rawlings | B64D 45/00 |
| D798,219 S* | 9/2017 | Xiao | D12/214 |
| 9,751,618 B2* | 9/2017 | Rawlings | B42D 25/324 |
| 9,834,301 B1 | 12/2017 | Patel et al. | |
| 9,848,485 B2* | 12/2017 | Corke | H05H 1/2439 |
| 9,868,135 B2* | 1/2018 | Williams | B29C 48/154 |
| 9,883,822 B2* | 2/2018 | Bhagavat | H01L 27/14636 |
| 9,908,616 B1* | 3/2018 | Horn | B64C 29/0033 |
| 10,105,877 B2* | 10/2018 | Rawlings | B32B 27/288 |
| 10,118,696 B1* | 11/2018 | Hoffberg | B64C 39/001 |
| 10,495,121 B2* | 12/2019 | Smullin | B64C 23/005 |
| 10,527,074 B2* | 1/2020 | Corke | F15D 1/12 |
| 10,543,908 B2* | 1/2020 | Stefes | B64C 13/16 |
| 10,953,982 B2* | 3/2021 | Moffitt | B64C 27/82 |
| 11,299,260 B2 | 4/2022 | Wine et al. | |
| 11,466,709 B2* | 10/2022 | Smits | F15D 1/007 |
| 11,519,433 B2* | 12/2022 | Wine | F15D 1/12 |
| 11,519,434 B2* | 12/2022 | Neiser | B64C 11/48 |
| 11,692,566 B2 | 7/2023 | Smits | |
| 11,744,157 B2* | 8/2023 | Wine | H10N 30/802 310/311 |
| 2002/0079405 A1* | 6/2002 | Layukallo | B64C 21/00 244/130 |
| 2002/0125376 A1* | 9/2002 | Karniadakis | F15D 1/12 244/204 |
| 2002/0131474 A1* | 9/2002 | Suga | G01K 13/02 374/138 |
| 2004/0046086 A1* | 3/2004 | Dixon | B64C 1/0009 244/204.1 |
| 2004/0197519 A1* | 10/2004 | Elzey | B32B 33/00 428/116 |
| 2004/0249257 A1* | 12/2004 | Tupin, Jr. | A61B 5/05 600/407 |
| 2005/0088057 A1* | 4/2005 | Kando | H03H 9/14505 310/313 B |
| 2005/0121240 A1* | 6/2005 | Aase | F15D 1/10 180/68.1 |
| 2005/0163963 A1* | 7/2005 | Munro | B64C 21/10 428/88 |
| 2005/0173591 A1* | 8/2005 | Colting | B64U 50/31 244/26 |
| 2005/0241605 A1* | 11/2005 | Bedwell | F16L 11/12 123/184.21 |
| 2006/0022092 A1* | 2/2006 | Miller | B64C 21/02 244/200.1 |
| 2006/0040532 A1* | 2/2006 | Ozawa | G06F 30/39 439/108 |
| 2006/0060722 A1* | 3/2006 | Choi | B64C 23/06 244/200.1 |
| 2006/0236777 A1* | 10/2006 | Chambers | F03G 7/06 73/801 |
| 2006/0266881 A1* | 11/2006 | Hughey | B64C 27/08 244/17.23 |
| 2006/0266882 A1* | 11/2006 | Kummer | B64C 23/02 244/55 |
| 2007/0018056 A1* | 1/2007 | Narramore | B64C 23/06 244/200.1 |
| 2007/0075184 A1* | 4/2007 | Marimon | B64B 1/42 244/30 |
| 2007/0095987 A1* | 5/2007 | Glezer | B64C 21/08 244/200.1 |
| 2007/0113932 A1* | 5/2007 | Tiliakos | B64C 30/00 148/402 |
| 2007/0205853 A1* | 9/2007 | Taya | H10N 35/00 335/205 |
| 2007/0222344 A1* | 9/2007 | Kornbluh | A63H 13/00 310/800 |
| 2007/0241229 A1 | 10/2007 | Silkey | |
| 2008/0128027 A1* | 6/2008 | Hyde | B64C 21/10 137/13 |
| 2008/0128560 A1* | 6/2008 | Hyde | B64C 23/005 244/203 |
| 2008/0128561 A1* | 6/2008 | Hyde | B64C 23/005 244/204 |
| 2008/0193307 A1* | 8/2008 | Elata | F04B 43/1223 417/474 |
| 2008/0217485 A1* | 9/2008 | Ikeda | F15D 1/12 244/204.1 |
| 2008/0245520 A1* | 10/2008 | Hyde | F28F 27/00 165/295 |
| 2009/0173837 A1* | 7/2009 | Silkey | F15D 1/12 701/3 |
| 2010/0123046 A1* | 5/2010 | Khozikov | H05H 1/2439 244/200.1 |
| 2010/0133386 A1 | 6/2010 | Schwimley | |

(56) References Cited

U.S. PATENT DOCUMENTS

| | | | |
|---|---|---|---|
| 2010/0219296 A1* | 9/2010 | Shelman-Cohen | B63B 1/34 416/223 R |
| 2010/0229952 A1* | 9/2010 | Smith | F15D 1/12 137/1 |
| 2010/0308177 A1 | 12/2010 | McClure | |
| 2011/0186685 A1 | 8/2011 | Tsotsis | |
| 2011/0224846 A1 | 9/2011 | Simon | |
| 2011/0295102 A1* | 12/2011 | Lakkis | A61B 5/02028 600/407 |
| 2012/0193483 A1* | 8/2012 | Essenhigh | B64C 23/005 244/205 |
| 2012/0267892 A1 | 10/2012 | Matsuda | |
| 2013/0001368 A1 | 1/2013 | Silkey | |
| 2013/0009016 A1* | 1/2013 | Fox | B64C 9/24 244/76 R |
| 2014/0144517 A1 | 5/2014 | Raja | |
| 2015/0104310 A1* | 4/2015 | Griffin | B64C 21/08 416/1 |
| 2015/0191244 A1* | 7/2015 | Rolston | B64C 21/06 244/200.1 |
| 2015/0257653 A1* | 9/2015 | Hyde | A61B 5/0077 600/407 |
| 2016/0089052 A1* | 3/2016 | Cho | A61B 5/1135 600/407 |
| 2016/0174842 A1* | 6/2016 | Hyde | H01Q 21/30 342/52 |
| 2017/0370387 A1* | 12/2017 | Nino | F15D 1/0075 |
| 2018/0298762 A1* | 10/2018 | Shelman-Cohen | F04D 29/681 |
| 2019/0136881 A1* | 5/2019 | Amitay | F15D 1/12 |
| 2019/0145443 A1 | 5/2019 | Smullin | |
| 2019/0300159 A1 | 10/2019 | Kikuchi | |
| 2020/0031456 A1* | 1/2020 | Wine | B64C 3/46 |
| 2020/0148335 A1 | 5/2020 | Wine et al. | |
| 2020/0176664 A1* | 6/2020 | Wine | F15D 1/007 |
| 2020/0191177 A1* | 6/2020 | Wine | F15D 1/0075 |
| 2020/0217337 A1* | 7/2020 | Loebig | F15D 1/12 |
| 2021/0348628 A1* | 11/2021 | Holloway | B64C 23/005 |
| 2022/0260098 A1* | 8/2022 | Smits | F15D 1/065 |
| 2023/0012961 A1* | 1/2023 | Marusic | B64C 21/04 |
| 2023/0044837 A1 | 2/2023 | Smits | |
| 2023/0304516 A1 | 9/2023 | Smits | |

FOREIGN PATENT DOCUMENTS

| | | |
|---|---|---|
| EP | 1 481 467 B1 | 12/2004 |
| EP | 1995171 A2 | 11/2008 |
| EP | 2 012 139 A1 | 1/2009 |
| FR | 1053332 A | 2/1954 |
| WO | 2001075934 A2 | 10/2001 |
| WO | WO-01/76934 A1 | 10/2001 |
| WO | WO-02/103304 A2 | 12/2002 |
| WO | WO-2006/040532 A1 | 4/2006 |
| WO | 2012036602 A1 | 3/2012 |
| WO | WO-2012/054086 A1 | 4/2012 |
| WO | 2015024601 A1 | 2/2015 |
| WO | WO-2016/179405 A1 | 11/2016 |
| WO | WO-2016/189448 A2 | 12/2016 |
| WO | 2020023395 A1 | 1/2020 |
| WO | 2020097114 A1 | 5/2020 |
| WO | 2021150755 A1 | 7/2021 |
| WO | 2021216152 A2 | 10/2021 |
| WO | 2022177960 A1 | 8/2022 |

OTHER PUBLICATIONS

International Search Report and Written Opinion dated May 3, 2021, PCT Application No. PCT/US2021/014417, 16 pages.

Ainajjar et al., "Receptivity of high-speed jets to excitation using an array of mems-based mechanical actuators", SME Fluids Engineering Division Summer Meeting, Jun. 22-26, 1997, pp. 1-6.

Alfredsson et al., "Large-eddy breakup devices—a 40 years perspective from a stockholm horizon", Flow Turbulence Combust, 2018, vol. 100, pp. 877-888.

Bird et al., "Compliant kagome lattice structures for generating in-plane waveforms", 2018, vol. 41, No. 142, pp. 86-101.

Bird et al., "Experimental control of turbulent boundary layers with in-plane travelling waves", Flow Turbulence Combust, 2018, vol. 100, pp. 1015-1035.

Bird et al., "In-plane forcing of a turbulent boundary layer, through the actuation of a compliant structure", DRFCM, 2015, pp. 1-2.

Braslow, "A History of suction-type laminar-flow control with emphasis on flight research", 1999, pp. 1-84.

Bushnell, "Chapter VIII : compliant surfaces introduction", Viscous Flow Drag Reduction, 1980, pp. 687-390.

Cattafesta et al., "Actuators for active flow control", Annu. Rev. Fluid Mech., 2001, vol. 43, pp. 247-272.

Chamorro et al., "Drag reduction of large wind turbine blades through riblets: evaluation of riblet geometry and application strategies", Renewable Energy, 2013, vol. 50, pp. 1095-1105.

Corke et al., "Active and passive turbulent boundary layer drag reduction", AIM Journal, 2018, vol. 56, pp. 3835-3847.

Gad-El-Hak et al., "Separation control: review", Journal of Fluids Engineering, 1991, vol. 13, pp. 5-30.

Gad-El-Hak, "Chapter 9: drag reduction using compliant walls", Flow Past Highly Compliant Boundaries and in Collapsible Tubes, Eds. Carpenter and Pedley, Mar. 26-31, 2001, pp. 191-229.

Garcia-Mayoral et al., "Drag rReduction by riblets", Phil Trans. R. Soc A, 2011, vol. 369, pp. 1412-1427.

Gatti et al., "Reynolds-number dependence of turbulent skin-friction drag reduction induced by spanwise forcing", J. Fluid Mech, 2016, vol. 802, pp. 553-582.

Gatti, "Turbulent drag reduction at moderate reynolds number via spanwise velocity waves", PAMM, 2012, 133 pages.

Gouder, "Turbulent friction drag reduction using electroactive polymer surfaces", Doctoral Thesis, Imperial College, May 2011.

Grosjean et al., "Micro balloon actuators for aerodynamic control", IEEE Proceedings MEMS 98, Jan. 25-28, 1998, pp. 1-6.

Hong et al., "Turbulent drag reduction with polymers in rotating disk flow", Polymers, vol. 7, pp. 279-1298.

Huang et al., "MEMS transducers for aerodynamics—a paradym shift", 38th Aerospace Sciences Meeting, 2000, pp. 1-7.

Hurst et al., "The effect of reynolds number on turbulent drag reduction by streamwise travelling waves", J. Fluid Mech., 2014, vol. 759, pp. 28-55.

Jones et al., "Modelling for robust feedback control of fluid flows", Journal of Fluid Mechanics, 2015, vol. 769, pp. 1-34.

Jung et al., "Suppression of turbulence in wall-bounded flows by high-frequency spanwise oscillations", Phys_ Fluids A, 1992, vol. 4, No. 8, pp. 1605-1607.

Kang et al., "Active wall motions for skin-friction drag reduction", Physics of Fluids, 2000, vol. 12, No. 12, pp. 3301-3304.

Karniadakis et al., "Mechanism on transverse motions in turbulent wall flows", Annu. Rev. Fluid Mech., 2003, vol. 35, pp. 45-62.

Kasagi et al., "Toward cost-effective control of wall turbulence of skin friction drag reduction", Advances in Turbulence XII, 2009, pp. 189-200.

Kline et al., "The structure of turbulent boundary layers", Journal of Fluid Mechanics, 1967, vol. 30, pp. 741-773.

Laadhari et al., "Turbulence reduction in a boundary layer by a local spanwise oscillating surface", Physics of Fluids, 1994, vol. 6, pp. 3218-3220.

Lee et al., "Control of roll moment by MEMS". American Society of Mechanical Engineers, 1996, pp. 1797-1803.

Leschziner, "Friction-drag reduction by transverse wall motion—a review", J. of Mechanics, DOI: 10.1017/ mech.2020_31, 15 pages.

Luhar et al., "A framework for studying the effect of compliant surface on wall turbulence", J. Fluid Mech., 2015, vol. 768, pp. 415-441.

Mahfoze et al., "Skin-friction drag reduction in a channel flow with streamwise-aligned plasma actuators," Intl J. of Heat and Fluid Flow, Butterworth Scientific LTD., Guildford, GB, 2017, vol. 66, pp. 83-94.

Marusic et al., "Predictive model for wall-bounded turbulent flow", Science, 2010, vol. 329, No. 5988, pp. 193-196.

(56) References Cited

OTHER PUBLICATIONS

Mathis et al., "Estimating wall-shear-stress fluctuations given an outer region input", Journal of Fluid Mechanics, 2013, vol. 715, pp. 163-180.
Melton et al., "Active flow control via discrete sweeping and steady jets on a simple-hinged flap", Aug. 2018, IM Journal, vol. 56, No. 8, pp. 2961-2973.
Morrison, "MEMS devices for active drag reduction in aerospace applications", Electronic and Optical Materials, 2014, pp. 153-176.
Naguib et al., "Arrays of MEMS-based actuators for control of supersonic jet screech", AIM, Jun. 29-Jul. 2, 1997, pp. 1-9.
Panton, "Overview of the self-sustaining mechanisms of wall turbulence", Prog. Aerosp. Sci., 2001, vol. 37, pp. 41-383.
Quadrio et al., "Streamwise-traveling waves of spanwise wall velocity for turbulent drag reduction", 2009, vol. 627, pp. 161-178.
Quadrio, "The laminar generalized stokes layer and turbulent drag reduction", J. Fluid. Mech., 2011, vol. 667, pp. 135-157.
Ricco, "Active and passive turbulent drag reduction", Workshop on Turbulent Skin Friction Drag Reduction, Imperial College London, Dec. 4-5, 2017, pp. 1-60.
Sareen et al., "Drag reduction using riblet film applied to airfoils for wind turbines", 49th Aerospaces Sciences Meeting, Jan. 4-7, 2011, pp. 1-19.
Schoppa et al., "A large-scale control strategy for drag reduction in turbulent boundary layers", Physics of Fluids, 1998, vol. 10, No. 5, pp. 1049-1051.
Schroder, "Drag reduction via transversal wave motions", Institute of Aerodynamics, 2017, pp. 1-22.
Shen, "Turbulent flow over a flexible wall undergoing a streamwise travelling wave motion", J. Fluid Mech., 2003, vol. 484, pp. 197-221.
Smith et al., "The characteristics of low-speed streaks in the near-wall region of a turbulent boundary layer", Journal of Fluid Mechanics, 1983, vol. 129, pp. 27-54.
Smits et al., "High reynolds number wall turbulence", Annu. Rev. Fluid Mech., 2011, vol. 43, pp. 353-375.
Symeonidis et al., "Drag reduction in wall-bound turbulence via a transverse travelling wave", J. Fluid Mech., 2002, vol. 457, pp. 1-34.
Tamano, "Turbulent drag reduction due to spanwise traveling waves with wall deformation", Nov. 20, 2014, OR 1779 Symposium, pp. 1-51.
Thomas et al., "Turbulent drag reduction using pulsed-DC plasma actuation", J. of Physics D: Appl. Phys., 2019, vol. 52, No. 34001, 13 pages.
Tomiyama et al., "Direct numerical simulation of drag reduction in a turbulent channel flow using spanwise traveling wave-like wall deformation", Physics of Fluids, 2013, vol. 25, pp. 1-22.
Tsao, "An integrated mems system for turbulent boundary layer control", IEEE Solid State Sensors and Actuators, 1997, pp. 1-4.
Tsao, "Micromachined magnetic actuators for active fluid control", International Mechanical Engineering Congress and Exposition, 1994, pp. 31-38.
Van Buren et al., "Piezoelectric driven oscillating surface (PDOS)", RPI, 2014, 6 pages.
Viotti et al., "Streamwise oscillation of spanwise velocity at the wall of a channel for turbulent drag reduction", Physics of Fluids, 2009, vol. 21, pp. 1-9.
Wang, "Flow over a surface with parallel grooves", May 2003, vol. 15, No. 5, pp. 1114-1121.
Yang et al., "Micro bellow actuators", IEEE International Solid State Sensors and Actuators Conference, 1997, pp. 1-4.
Zhao et al., "Turbulent drag reduction by traveling wave of flexible wall", Fluid Dynamics Research, 2004, vol. 34, pp. 175-198.
Zhong et al., "Reduction of pressure losses in a linear cascade using herringbone riblets", School of Mechanical, Aerospace and Civil Engineering, University of Manchester, Aug. 17, 2017, 16 pages.
Abbas et al., "Drag reduction via turbulent boundary layer flow control", Science China Technological Sciences, Science China Press, Heidelberg, Jul. 19, 2017, vol. 60, No. 9, pp. 1281-1290.
Atlintas et al., "Direct numerical simulation of drag reduction by spanwise oscillating dielectric barrier discharge plasma force", Phys. Fluids 32, 075101 2020, 12 pages.
Benard et al., "Electrical and mechanical characteristics of surface AC dielectric barrier discharge plasma actuators applied to airflow control", Exp Fluids, 2014, 55, 43 pages.
Benard et al., "Non-homogeneous streamwise wall forcing by surface plasma actuator", European Drag Reduction and Flow Control Meeting—EDRFCM 2019, Mar. 26-29, 2019, Bad Herrenalb, Germany, 2 pages.
Choi et al., "Turbulent boundary-layer control with plasma actuators", Phil. Trans. R. Soc. A, 2011, 369, pp. 1443-1458.
D'Adamo et al., "Control of the airflow close to a flat plate with electrohydrodynamic actuators", Jul. 14-18, 2002, Proceedings of ASME FEDSM'02: Flow Instabilities and Control Forum 2002 Fluids Engineering Division Summer Meeting Montreal, Quebec, Canada, 6 pages.
Duong et al., "Turbulent boundary layer drag reduction using pulsed-dc plasma actuation", Jul. 30 to Aug. 2, 2019, 11th International Symposium on Turbulence and Shear Flow Phenomena (TSFP11) Southampton, 6 pages.
Examination Report issued on GB0911332.5 dated Mar. 31, 2011, 4 pages.
Examination Report issued on GB0911333.3 dated Oct. 25, 2010, 2 pages.
Hehner et al., "Virtual wall oscillations forced by a DBD plasma actuator operating under beat frequency—a concept for turbulent drag reduction", AIAA Aviation Forum, Jun. 15-19, 2020, 7 p.
International Patent Application PCT/US2019/063409, International Search Report and Written Opinion dated Feb. 21, 2020, 11 pp.
International Patent Application PCT/US2021/014722, Written Opinion mailed Nov. 24, 2021, 17 pp.
International Patent Application PCT/US2022/016560, International Search Report and Written Opinion mailed May 30, 2022, 10 pp.
International Patent Application PCT/US2019/042832, International Search Report mailed Nov. 4, 2019, 3 pp.
International Patent Application PCT/US2019/059919, International Search Report mailed Apr. 15, 2020, 17 pp.
Jukes et al., "Turbulent boundary-layer control for drag reduction using surface plasma", 2nd AIAA Flow Control Conference, Jun. 28-Jul. 1, 2004, 11 pages.
Jukes et al., "Turbulent drag reduction by surface plasma through spanwise flow oscillation", 3rd AIAA Flow Control Conference, Jun. 5-8, 2006, 14 pages.
Kriegseis et al., "Towards in-flight applications? A review on dielectric barrier discharge-based boundary-layer control", Applied Mechanics Reviews, Mar. 2016, vol. 68, 41 pages.
Moreau et al., "Surface dielectric barrier discharge plasma actuators", ERCOFTAC Bulletin 94, 2014, 6 pages.
Moreau, "Airflow control by non-thermal plasma actuators", Phys. D: Appl. Phys., 2007, vol. 40, pp. 605-636.
Robinson, "Movement of air in the electric wind of the corona discharge", Research-Cottrell, Inc., 1960, 73 pages.
Roth et al., "Boundary layer flow control with a one atmosphere uniform glow discharge surface plasma", American Institute of Aeronautics and Astronautics, Inc., 98-0328, 1998, 28 pages.
Sato et al., "Successively accelerated ionic wind with integrated dielectric-barrier discharge plasma actuator for low voltage operation", Scientific Reports, 2019, vol. 9:5813, 11 pages.
Sontag et al., "Studies of pulsed-dc plasma actuator and its effect on turbulent boundary layers using novel optical diagnostics", AIAA SciTech, 2019, Jan. 7-11, 2019, 14 pages.
U.S. Appl. No. 16/674,870, Non-Final Office Action Mailed May 26, 2022, 22 pp.
U.S. Appl. No. 16/740,154, Non-Final Office Action Mailed May 6, 2022, 24 pp.
U.S. Appl. No. 16/696,810, Non-Final Office Action Mailed Jun. 27, 2022, 11 pp.
U.S. Appl. No. 17/154,763, Non-Final Office Action Mailed May 10, 2023, 27 pp.

(56) References Cited

OTHER PUBLICATIONS

U.S. Appl. No. 17/673,535, Notice of Allowance mailed Jul. 26, 2022, 11 pp.
Wang et al., "Recent developments in DBD plasma flow control", Progress In Aerospace Sciences, 2013, vol. 62, pp. 52-78.
Whalley et al., "Turbulent boundary-layer control with plasma spanwise travelling waves", Experiments in Fluids, 2014, vol. 55(1796), 1-16.
Wong et al., "Turbulent boundary layer control based on DBD plasma-actuator-generated vortices", 20th Australasian Fluid Mechanics Conference, Dec. 5-8, 2016, 4 pages.
Xin et al., "Turbulent boundary layer separation control using plasma actuator at Reynolds No. 2000000", Chinese Society of Aeronautics and Astronautics & Beihang University, Chinese J. of Aeronautics, 2016, 10 p.

* cited by examiner

SYSTEMS AND METHODS FOR ACTIVE CONTROL OF SURFACE DRAG USING INTERMITTENT OR VARIABLE ACTUATION

CROSS-REFERENCE TO RELATED PATENT APPLICATION

This application is a U.S. National Stage Application under 35 U.S.C. § 371 of International Patent Application No. PCT/US2021/014417, filed Jan. 21, 2021, which claims the benefit of and priority to U.S. Provisional Application No. 62/965,077, filed Jan. 23, 2020, the entire disclosure of each of which is incorporated by reference herein.

BACKGROUND

The present disclosure relates generally to the field of fluid flow over surfaces. More particularly, the present disclosure relates to systems and methods for control of surface drag.

Surface drag is a force that acts opposite to the relative motion of an object moving through a fluid. Various material bodies in contact with a moving fluid, including but not limited to air, water, and ground transportation platforms, rotating or translating blades moving through air or water, and fluids transported through pipes and channels, experience some measure of surface drag, which can lead to slower speeds and less fuel efficiency.

SUMMARY

At least one aspect of the present disclosure relates to a system including a surface, an actuator, and processing circuitry, according to some embodiments. In some embodiments, the surface includes one or more non-actuating zones and one or more actuatable zones. In some embodiments, the actuator is configured to adjust a flow property of a fluid that flows over the one or more actuatable zones of the surface. In some embodiments, the processing circuitry is configured to obtain a value of a parameter of the fluid that flows over the surface, and operate the actuator to adjust the flow property of the fluid that flows over the one or more actuatable zones based on the value of the parameter of the fluid.

In some embodiments, the flow property is a flow rate of the fluid.

In some embodiments, the one or more actuatable zones are spaced a predetermined distance apart along the surface.

In some embodiments, the predetermined distance is between 10 mm and 50 mm.

In some embodiments, at least one of a size, spacing, orientation, or shape of the non-actuating and actuatable zones of the surface are based on a parameter of the fluid.

In some embodiments, at least one of a size, spacing, orientation, or shape of the non-actuating and actuatable zones of the surface are based on a spanwise or streamwise position of the non-actuating zones or the actuatable zones relative to a start of a boundary layer of the fluid.

In some embodiments, at least one of a size, spacing, orientation, or shape of the non-actuating and actuatable zones of the surface are based on a convective time scale of the fluid.

In some embodiments, the convective time scale has a value between $10\eta'$ and $10,000\eta'$, where $\eta'$ is a viscous time scale of a flow regime of the fluid.

In some embodiments, the actuator includes at least one of a dielectric-barrier discharge (DBD) device, a motion of the surface, or one or more fluid jets.

In some embodiments, the actuator is configured to adjust a surface topology of the one or more actuatable zones.

In some embodiments, the system further includes one or more sensors. In some embodiments, the processing circuitry is configured to operate the actuator of the one or more actuatable zones to adjust the flow property of the fluid based on one or more local flow parameters of the fluid and one or more sensor inputs of the one or more sensors.

In some embodiments, the processing circuitry is configured to operate the actuator to adjust the flow property of the fluid flowing over the one or more actuatable zones according to one or more actuation parameters.

In some embodiments, the processing circuitry is configured to change the one or more actuation parameters over time at a rate of change based on one or more local flow parameters of the fluid.

In some embodiments, the rate of change of the one or more actuation parameters is based on a rate of change of the one or more local flow parameters of the fluid.

In some embodiments, the one or more actuation parameters are associated with corresponding zones of the one or more actuatable zones. In some embodiments, one or more of the actuatable zones include one or more sub-zones, each of the one or more sub-zones associated with a corresponding set of actuation parameters.

In some embodiments, adjustment of the actuator of the one or more actuatable zones in combination with a surface topology of the one or more non-actuating zones adjusts an overall surface topology of the surface to adjust the flow property of the fluid.

Another implementation of the present disclosure is a controller including processing circuitry, according to some embodiments. In some embodiments, the processing circuitry is configured to obtain a value of a parameter of a fluid that flows over the surface. In some embodiments, the surface includes one or more actuatable zones and one or more non-actuating zones. In some embodiments, the processing circuitry is configured to operate an actuator to adjust a flow property of the flow that flows over the one or more actuatable zones based on the value of the parameter of the fluid.

In some embodiments, the flow property is a flow rate of the fluid.

In some embodiments, the one or more actuatable zones of the surface are spaced a predetermined distance apart along the surface.

In some embodiments, the predetermined distance is between 10 mm and 50 mm.

In some embodiments, any of a size, spacing, orientation, or shape of the non-actuating and actuatable zones of the surface are based on a parameter of the fluid.

In some embodiments, any of a size, spacing, orientation, or shape of the non-actuating and actuatable zones of the surface are based on a spanwise or streamwise position of the non-actuating zones or the actuatable zones relative to a start of a boundary layer of the fluid.

In some embodiments, any of a size, spacing, orientation, or shape of the non-actuating and actuatable zones of the surface are based on a convective time scale of the fluid.

In some embodiments, the convective time scale has a value between $10\eta'$ and $10,000\eta'$, where $\eta'$ is a viscous time scale of a flow regime of the fluid.

In some embodiments, the actuator includes at least one of a dielectric-barrier discharge (DBD) device, a motion of the surface, or one or more fluid jets.

In some embodiments, the actuator is configured to adjust a surface topology of the one or more actuatable zones.

In some embodiments, the processing circuitry is further configured to obtain one or more sensor inputs from one or more sensors. In some embodiments, the processing circuitry is configured to operate the actuator to adjust the flow property of the fluid based on one or more local flow parameters of the fluid and one or more sensor inputs.

In some embodiments, the processing circuitry is configured to operate the actuator to adjust the flow property of the fluid flowing over the one or more actuatable zones according to one or more actuation parameters.

In some embodiments, the processing circuitry is configured to change the one or more actuation parameters over time at a rate of change based on one or more local flow parameters of the fluid.

In some embodiments, the rate of change of the one or more actuation parameters is based on a rate of change of the one or more local flow parameters of the fluid.

In some embodiments, the one or more actuation parameters are associated with corresponding zones of the one or more actuatable zones. In some embodiments, one or more of the actuatable zones include one or more sub-zones, each of the one-or more sub zones associated with a corresponding set of actuation parameters.

In some embodiments, adjustment of the surface topology of the one or more actuatable zones in combination with a surface topology of the one or more non-actuating zones adjusts an overall surface topology of the surface to adjust the flow property of the fluid.

Another implementation of the present disclosure is a method for controlling a property of a fluid, according to some embodiments. In some embodiments, the method includes providing a surface comprising one or more actuatable zones and one or more non-actuating zones. In some embodiments, the method includes obtaining a value of a parameter of a fluid that flows over the surface. In some embodiments, the method includes operating an actuator to adjust a flow property of the fluid that flows over the one or more actuatable zones based on the value of the parameter of the fluid.

In some embodiments, the flow property is a flow rate of the fluid.

In some embodiments, the one or more actuatable zones of the surface are spaced a predetermined distance apart along the surface.

In some embodiments, the predetermined distance is between 10 mm and 50 mm.

In some embodiments, any of a size, spacing, orientation, or shape of the non-actuating and actuatable zones of the surface are based on a parameter of the fluid.

In some embodiments, any of a size, spacing, orientation, or shape of the non-actuating and actuatable zones of the surface are based on a spanwise or streamwise position of the non-actuating zones or the actuatable zones relative to a start of a boundary layer of the fluid.

In some embodiments, any of a size, spacing, orientation, or shape of the non-actuating and actuatable zones of the surface are based on a convective time scale of the fluid.

In some embodiments, the convective time scale has a value between $10\eta'$ and $10,000\eta'$, where $\eta'$ is a viscous time scale of a flow regime of the fluid.

In some embodiments, the actuator includes at least one of a dielectric-barrier discharge (DBD) device, a motion of the surface, or one or more fluid jets.

In some embodiments, the actuator is configured to adjust a surface topology of the one or more actuatable zones.

In some embodiments, the method further includes obtaining one or more sensor inputs from one or more sensors. In some embodiments, operating the actuator includes operating the actuator to adjust the flow property of the fluid based on one or more local flow parameters of the fluid and one or more sensor inputs.

In some embodiments, operating the actuator includes operating the actuator to adjust the flow property of the fluid flowing over the one or more actuatable zones according to one or more actuation parameters.

In some embodiments, the method further includes comprising changing the one or more actuation parameters over time at a rate of change based on one or more local flow parameters of the fluid.

In some embodiments, the rate of change of the one or more actuation parameters is based on a rate of change of the one or more local flow parameters of the fluid.

In some embodiments, the one or more actuation parameters are associated with corresponding zones of the one or more actuatable zones. In some embodiments, one or more of the actuatable zones include one or more sub-zones, each of the one-or more sub zones associated with a corresponding set of actuation parameters.

In some embodiments, adjusting the actuator of the one or more actuatable zones in combination with a surface topology of the one or more non-actuating zones adjusts an overall surface topology of the surface to adjust the flow property of the fluid.

Another implementation of the present disclosure is a wind turbine, according to some embodiments. In some embodiments, the wind turbine includes multiple turbine blades. In some embodiments, the wind turbine includes a base configured to support the turbine blades. In some embodiments, the multiple turbine blades are configured to rotate relative to the base as a fluid flows across the multiple turbine blades. In some embodiments, the wind turbine includes a fluid control system positioned on at least one of the turbine blades. In some embodiments, the fluid control system includes an actuator, and processing circuitry. In some embodiments, the actuator is configured to adjust a flow property of a fluid that flows over one or more actuatable zones of a surface. In some embodiments, the processing circuitry is configured to obtain a value of a parameter of the fluid, and operate the actuator to adjust the flow property of the fluid based on the value of the parameter of the fluid.

In some embodiments, the flow property is at least one of a flow rate, a velocity, a momentum, a transverse momentum, a shear stress, a velocity profile, a velocity gradient, or a skin-friction coefficient of the fluid.

In some embodiments, at least one of a size, spacing, orientation, or shape of one or more non-actuating and the actuatable zones of the surface are based on a convective time scale of the fluid, wherein the convective time scale has a value between $10\eta'$ and $10,000\eta'$, where $\eta'$ is a viscous time scale of a flow regime of the fluid.

Another implementation of the present disclosure is an aircraft, according to some embodiments. In some embodiments, the aircraft includes a fuselage, a component including at least one of a wing or a flight control surface coupled with the fuselage, and a fluid control system positioned on at least one of fuselage or the component. In some embodiments, the fluid control system includes an actuator configured to adjust a flow property of a fluid that flows over one or more actuatable zones of the fuselage or the component, and processing circuitry. In some embodiments, the processing circuitry is configured to obtain a value of a parameter of the fluid, and operate the actuator to adjust the flow property of the fluid based on the value of the parameter of the fluid.

In some embodiments, the flow property is at least one of a flow rate, a velocity, a momentum, a transverse momentum, a shear stress, a velocity profile, a velocity gradient, or a skin-friction coefficient of the fluid.

In some embodiments, at least one of a size, spacing, orientation, or shape of one or more non-actuating and the actuatable zones of a surface of the fuselage or the component are based on a convective time scale of the fluid, wherein the convective time scale has a value between $10\eta'$ and $10,000\eta'$, where $\eta'$ is a viscous time scale of a flow regime of the fluid.

This summary is illustrative only and is not intended to be in any way limiting. Other aspects, inventive features, and advantages of the devices and/or processes described herein, as defined solely by the claims, will become apparent in the detailed description set forth herein, taken in conjunction with the accompanying figures, wherein like reference numerals refer to like elements.

DETAILED DESCRIPTION

Figure 1:
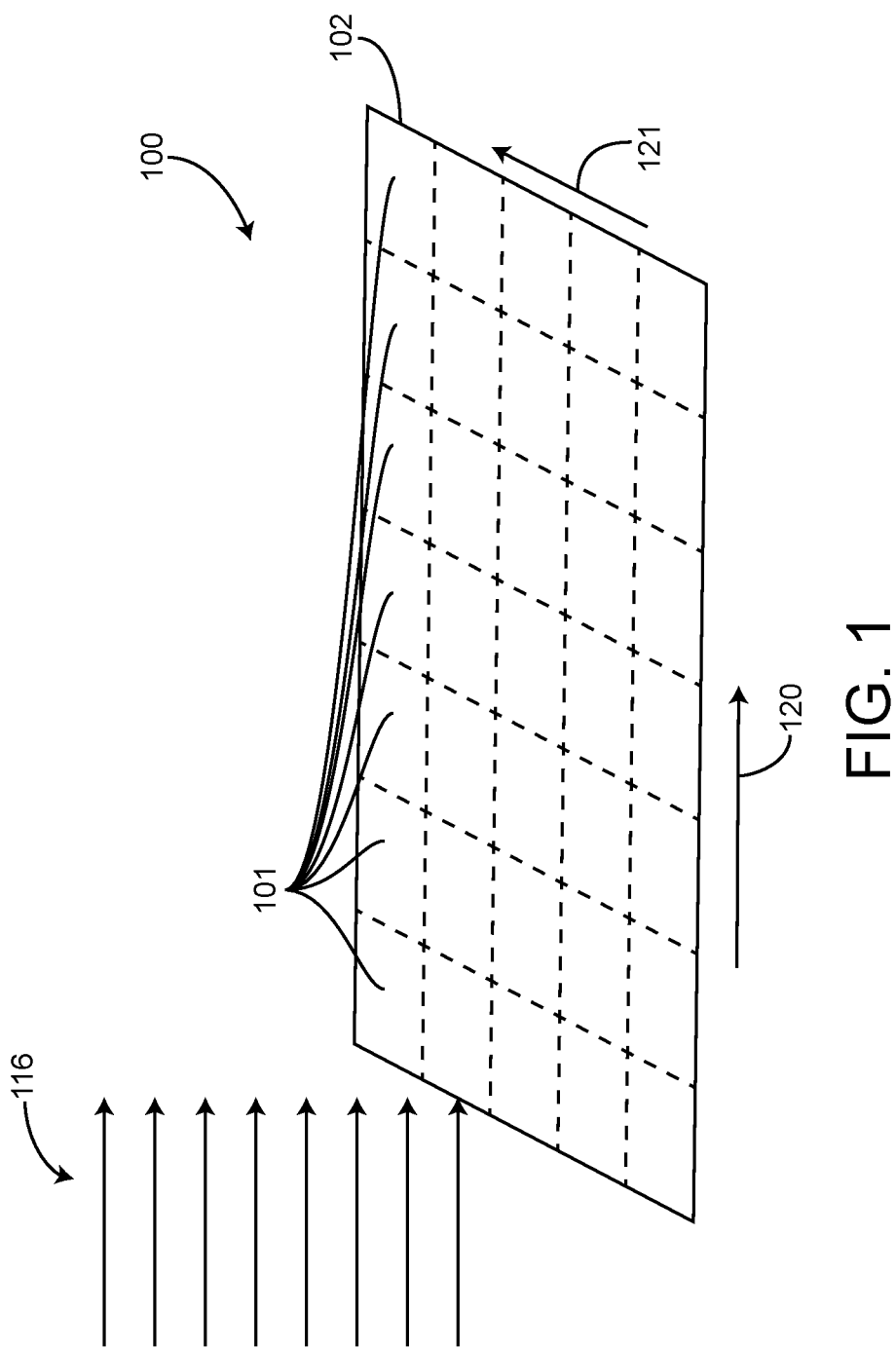
FIG. 1 is a diagram of a fluid control system for active adjustment of surface drag, according to an embodiment of the present disclosure.

Before turning to the figures, which illustrate the exemplary embodiments in detail, it should be understood that the present disclosure is not limited to the details or methodology set forth in the description or illustrated in the figures. It should also be understood that the terminology used herein is for the purpose of description only and should not be regarded as limiting.

System Overview

Referring generally to the figures, systems and methods described herein can be used to control drag on surfaces. Drag is a force acting opposite to the relative motion of any object moving with respect to a surrounding fluid. Drag manipulation technology has a wide range of applications for improving performance of systems that involve fluid flowing over a surface. For example, efficiency and speed can be increased in all manners of air transportation, including commercial aircraft, military aircraft, rockets, unmanned aerial vehicles, and general aviation. Reducing drag also increases efficiency in ground transportation such as in trains, cars, and tractor trailers. Water transportation, including maritime shipping, personal boating, and undersea transportation can similarly be benefited by reducing drag. Reducing drag can also boost efficiency when transporting fluids through pipes such as in natural gas or oil pipelines. Furthermore, power systems such as wind turbines are also limited in efficiency by drag on their working surfaces. Reducing drag on turbine blades and other surfaces can improve power generation efficiency, reduce operating costs and minimize environmental impacts. Manipulating drag can be valuable across a wide range of Reynolds numbers, including relatively high Reynolds numbers experienced by maritime shipping through water and the relatively low Reynolds numbers experienced by unmanned aerial vehicles. Selectively increasing drag can also be useful for braking, steering, and other control of bodies moving through the fluid, such as movable platforms (e.g., vehicles). Being able to actively control surface drag of an object allows for not only the minimization of surface drag when efficiency or speed is most needed, but it can also allow for better steering and braking capabilities through selectively increasing surface drag.

Air acts as a viscous fluid at sub-sonic speeds. An object moving through air may collect a group of air particles, which the object tends to pull along as the object moves. Air particles close to the surface of the object tend to move with approximately the same velocity as the object due to molecular adhesion. As a flat plate, airfoil, or other object moves through a free stream of air at a given relative velocity, molecular adhesion causes a boundary layer of air having relative velocities below that of the relative free stream velocity to form adjacent the object surface. The boundary layer can be a layer of air surrounding an object in which the relative velocity of the layer of molecules closest to the object is at or near zero, and in which the relative velocity at successively distant points from the object increases until it approaches that of the free stream, at which point the outer limit of the boundary layer is reached. For example, for an airfoil, the boundary layer can include the interface between the airfoil and the air mass surrounding the airfoil. The boundary layer may be relatively small as compared to a size dimension of the object. The difference between the free stream velocity and the relative velocities in the boundary layer region contribute to drag. Thus, increasing the relative velocities in the boundary layer region can reduce drag, and conversely, decreasing the relative velocities in the boundary layer region can increase drag. Drag may be caused by disturbances in flow, retarding flow near a surface. Such disturbances may not be damped as the Reynolds number increases, which can lead to interactions that cause increasing disturbances, such as turbulent eddies. Disturbances may flow away from the surface into the outer boundary layer, which can cause continued disturbances. The present solution can control surface drag by controlling the difference between the velocity of the free stream and the relative velocities of the boundary layer, such as by interrupting the generation of disturbances near the surface. These disturbances can be interrupted by moving or deforming the surface directly, or energizing the fluid using surface-based actuators.

Turbulent flow in boundary layers can contribute towards drag. A turbulent boundary layer can have a large number of eddies that transfer momentum from the faster moving outer portions of the boundary layer to the relatively slower portions closer to the surface. As such, turbulent boundary layers may have more surface friction than laminar boundary layers, which have more smooth flows, and are generally free from these eddies. Making the boundary layer less turbulent can be used to decrease drag, and conversely making the boundary layer more turbulent can be used to increase drag.

Both spanwise (or transverse) and streamwise motion, or some combination of the two, can affect the drag by disrupting eddies by injecting additional momentum to the fluid. One method to do this is to create one or more surface waves (mechanical waves that propagate along the interface between the deformable surface and the fluid) that can manipulate the boundary layer in one or more directions. The surface waves can be simple surface waves such as sinusoidal waves or may be any other type of waves, including but not limited to superposition of sinusoids. Further, the waveform of the surface waves may be aperiodic or damped, or may comprise numerous surface displacements or deformations. Any of a variety of signal processing and analysis techniques may be applied in order to generate the desired waveforms, including but not limited to Fourier transforms, fast Fourier transforms (FFTs), wavelet transforms, and the like.

The same combination of transverse or streamwise motion can be imparted to the fluid directly using actuators such as dielectric-barrier discharge devices (DBDs) mounted on the surface. These do not move the surface directly, but impact transverse momentum to the fluid by creating electrical and/or thermal gradients in the fluid which accelerate fluid molecules in some region above the surface.

Although many of the concepts disclosed herein may be described with reference to air as being the fluid medium, the present solution can enable active control of surface drag of any of a variety of fluids.

A fluid control system can include a surface over which a fluid flows. The fluid control system may also include a sensor that is configured to measure one or more parameters of the fluid that follows over the surface. For example, the sensor may be configured to measure one or more parameters or properties of the fluid that indicate a degree of turbulence of the fluid that flows over the surface, or may be configured to measure properties from which one or more parameters or properties of the fluid can be calculated. A controller is operably coupled with the sensor and is configured to use information or data from the sensor (e.g., values of the one or more parameters or properties of the fluid) to adjust an operation of one or more actuators of the fluid control system. The surface may include one or more actuation or actuatable zones, and one or more non-actuation or non-actuatable zones. The actuation or actuatable zones may be positioned along a streamwise direction of the fluid. Each actuation zone can include multiple movable, deformable, or adjustable sections that define the actuation zone. Each movable section may include a corresponding actuator that can be operated or translated by the controller to control the parameter of the fluid. Operating the actuators may change a surface topology of the actuation zones to control the parameter of the fluid. The non-actuation zones may have a fixed surface topology. Advantageously, using one or more actuation zones and one or more non-actuation zones may result in reduced power consumption of the fluid control system, improved efficiency of the fluid control system, and reduced weight of the fluid control system.

Figure 2:
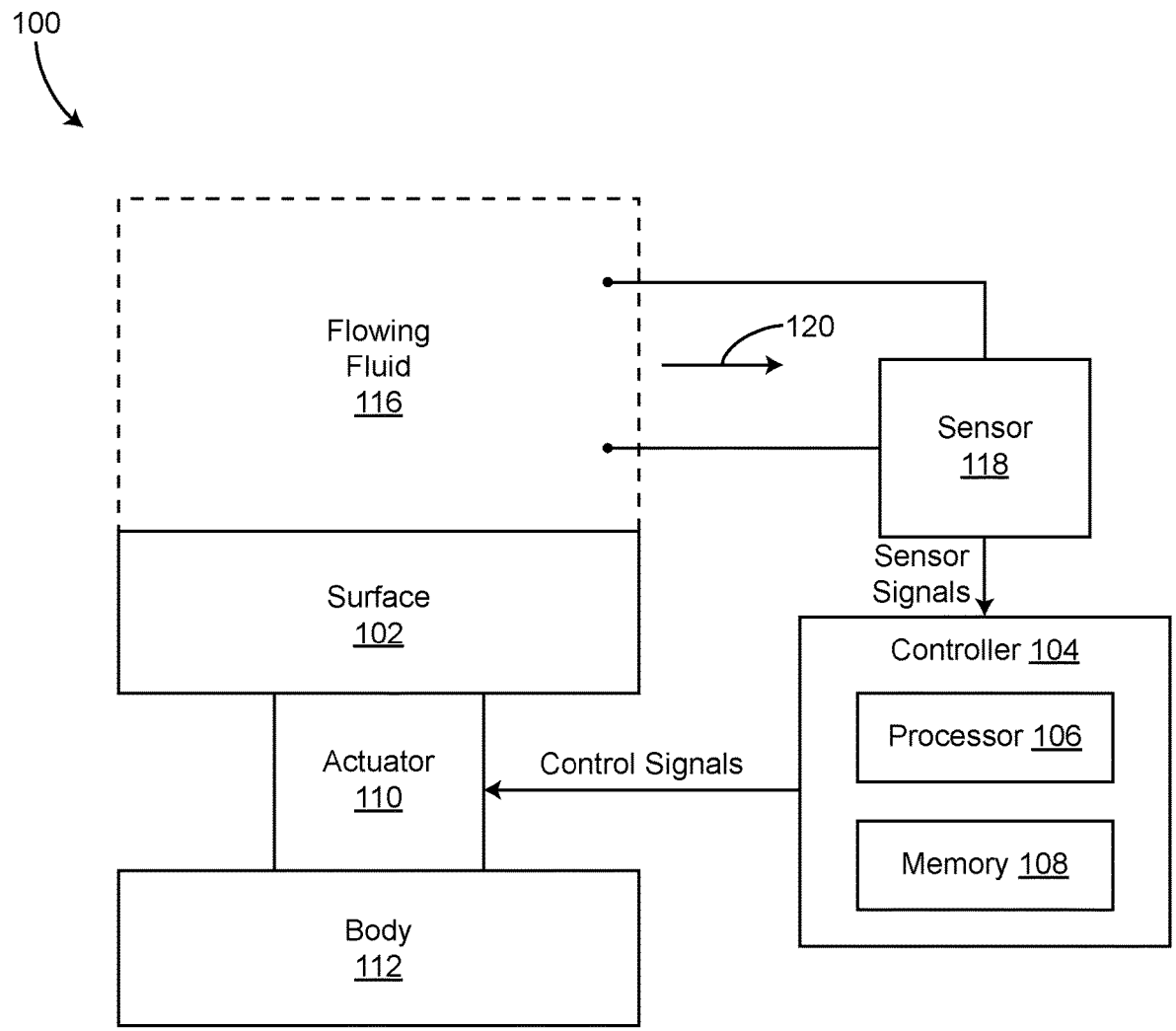
FIG. 2 is a block diagram of a fluid control system for active adjustment of surface drag, according to an embodiment of the present disclosure.

Referring to FIGS. 1 and 2, a fluid control system 100 can include an actuator 110 coupled to a surface 102 over which a fluid 116 (e.g., air, a liquid, a gas, etc.) flows. The actuator 110 can be configured according to various embodiments to (a) move the surface 102 relative to the fluid 116, (b) form a portion of the surface 102 that interacts with the fluid 116, or some combination of (a) and (b), (c). The actuator 110 can be disposed in a body 112 defining the surface 102 (d). In some embodiments, the actuator 110 is coupled to a bulk material (e.g., the body 112), (also d) and can be actuated at least one of electrostatically or electromagnetically to propagate waves (e.g., surface waves in the material or waves in the fluid, as described above). The actuator 110 can be configured to operate to adjust a surface topology of one or more actuatable zones of the surface 102. In some embodiments, the fluid control system 100 includes multiple sets of one or more actuators 110 that are configured to adjust the surface topology of a corresponding one of the actuation zones of the surface 102. The actuation 110 can be or include any of a dielectric-barrier discharge (DBD) device, a motion of the surface 102, or one or more fluid jets configured to inject fluid into the fluid 116.

Figure 6:
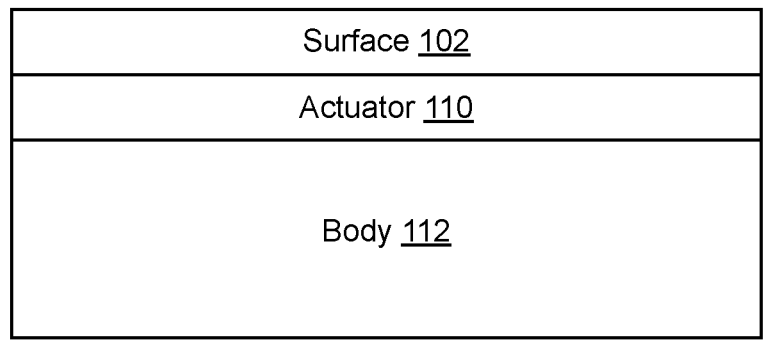
FIG. 6 is a view of a portion of the fluid control system of FIG. 1, showing a first configuration of an actuator of the fluid control system of FIG. 1, according to an embodiment of the present disclosure.

Referring particularly to FIG. 6, a configuration 600 of the actuator 110, the surface 102, and the body 112 is shown, according to some embodiments. Specifically, the configuration 600 illustrates option (a) discussed above. The configuration 600 includes the surface 102, the actuator 110, and the body 112. The actuator 110 is disposed within the body 112 and is configured to move the surface 102 (e.g., relative to a fluid that flows over the surface 102) to adjust or change a topology of the surface 102.

Figure 7:
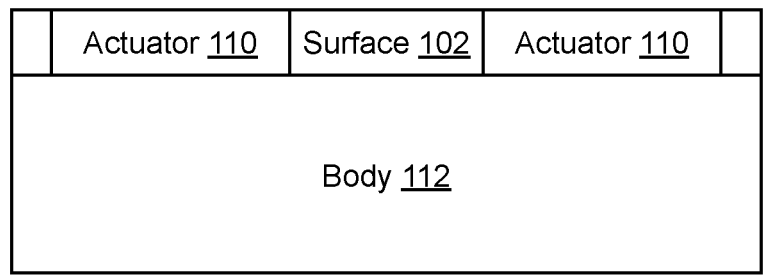
FIG. 7 is a view of a portion of the fluid control system of FIG. 1, showing a second configuration of an actuator of the fluid control system of FIG. 1, according to an embodiment of the present disclosure.

Referring particularly to FIG. 7, another configuration 700 of the actuator 110, the surface 102, and the body 112 is shown, according to some embodiments. Specifically, the configuration 700 illustrates option (b) discussed above. The configuration 700 includes one or more actuators 110 that are formed as part of the surface 102. The actuators 110 can be configured to move to thereby adjust the topology of the surface 102.

Figure 8:
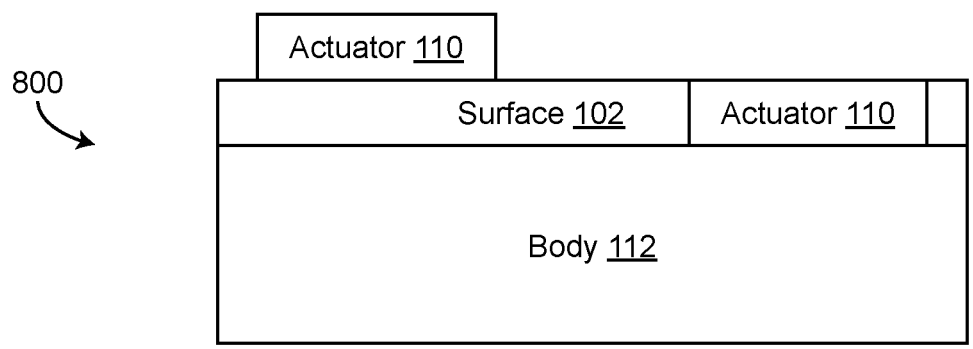
FIG. 8 is a view of a portion of the fluid control system of FIG. 1, showing a third configuration of an actuator of the fluid control system of FIG. 1, according to an embodiment of the present disclosure.

Referring particularly to FIG. 8, another configuration 800 of the actuator 110, the surface 102, and the body 112 is shown, according to some embodiments. Specifically, the configuration 800 illustrates option (c) discussed above. The configuration 800 includes one or more actuators 110 that are formed as part of the surface 102 and one or more actuators 110 that are configured to move the surface 102 relative to fluid that flows over the surface 102.

Figure 9:
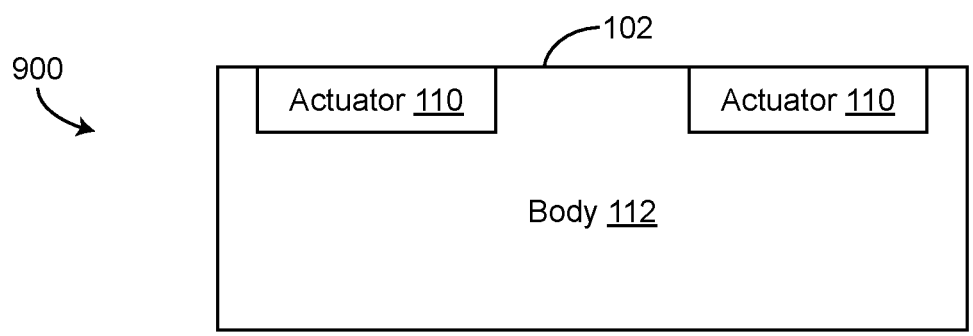
FIG. 9 is a view of a portion of the fluid control system of FIG. 1, showing a fourth configuration of an actuator of the fluid control system of FIG. 1, according to an embodiment of the present disclosure.

Referring particularly to FIG. 9, another configuration 900 of the actuator 110 and the body 112 is shown, according to some embodiments. In the configuration 900, one or more actuators 110 is/are coupled with the body 112 that defines the surface 102, so that the actuators 110 can be actuated at least one of electrostatically or electromagnetically to propagate waves (e.g., surface waves).

Referring again to FIGS. 1-2, fluid 116 may define a streamwise direction 120 along a first axis (e.g., a longitudinal direction), and a spanwise (transverse) direction 121 that is orthogonal to streamwise direction 120. Surface 102 can include multiple adjustable sections 101 that are arranged in an array. Fluid 116 may flow across surface 102 in streamwise direction 120 as shown in FIGS. 1 and 2.

The fluid control system 100 includes a controller 104. The controller 104 can include a processor 106 and memory 108. The processor 106 can be a general purpose or specific purpose processor, an application specific integrated circuit (ASIC), one or more field programmable gate arrays (FPGAs), a group of processing components, or other suitable processing components. The processor 106 is configured to execute computer code or instructions stored in memory 108 or received from other computer readable media (e.g., CDROM, network storage, a remote server, etc.). Memory 108 can include one or more devices (e.g., memory units, memory devices, storage devices, etc.) for storing data and/or computer code for completing and/or facilitating the various processes described in the present disclosure. Memory 108 can include random access memory (RAM), read-only memory (ROM), hard drive storage, temporary storage, non-volatile memory, flash memory, optical memory, or any other suitable memory for storing software objects and/or computer instructions. Memory 108 can include database components, object code components, script components, or any other type of information structure for supporting the various activities and information structures described in the present disclosure. Memory 108 can be communicably connected to processor 106 via controller 104 and may include computer code for executing (e.g., by processor 106) one or more processes described herein. When processor 106 executes instructions stored in memory 108, processor 106 generally configures the controller 104 to complete such activities.

The controller 104 can generate a control signal to control operation of the actuator 110, such as to cause the actuator 110 to actuate a section of the surface 102 relative to the fluid 116. The controller 104 can select parameters of the control signal, such as frequency and amplitude, based on desired transverse surface wave properties. For example, the controller 104 can select a parameter of the control signal corresponding to an expected change in drag of the fluid 116 relative to the surface 102. The controller 104 can execute a wave function that maps parameter(s) of the control signal to parameters of resulting transverse surface waves generated using operation of the actuator 110, and a drag function that maps the parameters of the resulting transverse surface waves to corresponding changes in drag of the fluid 116 flowing over the surface 102, and can execute the wave function and the drag function to select the parameter(s) of the control signal.

The controller 104 can control operation of the actuator 110 to control one or more parameters of the surface wave, such as at least one of an amplitude, wavelength, or frequency of the surface wave (e.g., amplitude A, wavelength λ, frequency ω). For example, the controller 104 can control an amplitude, frequency, or intermittency of movement of the actuator 110 (e.g., actuation parameters) to control the one or more parameters of the surface. The controller 104 can control the one or more parameters of the surface wave based on a parameter of the fluid 116. Each of multiple actuation zones can have a corresponding set of actuation parameters (e.g., operational parameters, parameters of the surface wave, etc.). For example, the controller 104 can control operation of the actuator 110 to achieve target values for the one or more parameters of the surface wave based on a viscous length scale η and/or a viscous time scale η' of the fluid 116, where η is defined according to Equation 1 below and η' is defined according to Equation 2 below, where ν is the kinematic viscosity of the fluid 116, $\tau_w$ is the wall shear stress of the fluid 116 relative to the surface 102, and ρ is the density of the fluid:

$$\eta = \frac{\nu}{\sqrt{\frac{\tau_w}{\rho}}} \quad \text{(Equation 1)}$$

$$\eta' = \frac{\nu}{\frac{\tau_w}{\rho}} \quad \text{(Equation 2)}$$

The controller 104 can also determine a value of a streamwise length scale using the viscous length scale η. The streamwise length scale may have a value approximately equal to or between 10η and 100,000η, where η is the viscous length scale of a flow regime of the fluid 116. The controller 104 can also determine a convective time scale of the fluid 116 based on the viscous time scale. The convective time scale can have a value approximately equal to or between 10η' and 100,000η', where η' is a viscous time scale of a flow regime of the fluid 116.

Fluid control system 100 can include a sensor 118. Sensor 118 can be configured to measure a parameter of fluid 116 (e.g., friction velocity, surface shear stress, viscosity, pressure, temperature, or other parameters indicative of turbulence or drag, the viscous length scale n as shown above) or may be configured to measure one or more values of different parameters (e.g., kinematic viscosity, wall shear stress, density, temperature, etc.) that can be used (e.g., by controller 104) to calculate the parameter of fluid 116. Sensor 118 provides the measure parameter(s) to controller 104. The sensor 118 can be configured to obtain sensor data upstream or downstream of a control surface or an array of control surfaces where one or more actuators 110 are located, or in between elements of actuators 110. Generally, the sensor 118 may be located upstream, downstream, or in a same region as the actuator 110. The sensor 118 can provide sensor values to the controller 104 for use in determining the viscous length scale η using Equation 1 shown above or the viscous time scale η' using Equation 2 shown above, the streamwise length scale, the convective time scale of the fluid 116 or of the flow regime of the fluid.

Controller 104 can use the measured parameters to generate control signals for actuator 110. Actuator 110 is operably coupled with surface 102 so that operation of actuator 110 controls, adjusts, increases, modulates, etc., the parameter measured by sensor 118. In some embodiments, the parameter measured by the sensor 118 is a flow property (e.g., a flow rate of the fluid 116). For example, actuator 110 may be or include a mechanical transducer that is configured to transform electrical energy to any form of mechanical energy (e.g., rotary mechanical energy, linear mechanical energy, translate motion, rotary motion, etc.). Operation of actuator 110 may adjust, modulate, change, etc., one or more surface parameters of surface 102 to control or adjust the parameter of surface 102 that is measured by sensor 118. Operation of actuator 110 may adjust various surface parameters of surface 102, thereby controlling fluid 116 (e.g., adjusting a parameter or flow property of the fluid 116 including at least one of a flow rate, a velocity, a momentum, a transverse momentum, a shear stress, a velocity profile, a velocity gradient, or a skin-friction coefficient of the fluid 116) and reducing drag of fluid 116 across surface 102 (e.g., reducing surface shear stress).

Actuator 110 may be configured to translate, move, adjust a position of, etc., one or more movable sections of surface 102. For example, adjustable sections 101 may be movable, deformable, or otherwise adjustable sections. In one embodiment, surface 102 includes one or more areas that are movable or actuatable or include movable sections, and one or more areas that are fixed (e.g., non-movable or non-actuatable sections).

Fluid control system 100 may operate in a closed-loop manner using sensor signals or real-time values of the parameter as obtained by or calculated based on sensor 118. Controller 104 can use the sensor signals or the real-time values of the parameter of fluid 116 in real-time to determine adjustments for surface 102 (e.g., to determine control signals for actuator 110) to control the parameter of fluid 116 as desired or to achieve a desired value of the parameter of fluid 116 (e.g., to reduce drag of surface 102).

Drag Reduction Using Actuatable and Non-Actuatable Zones

Figure 4:
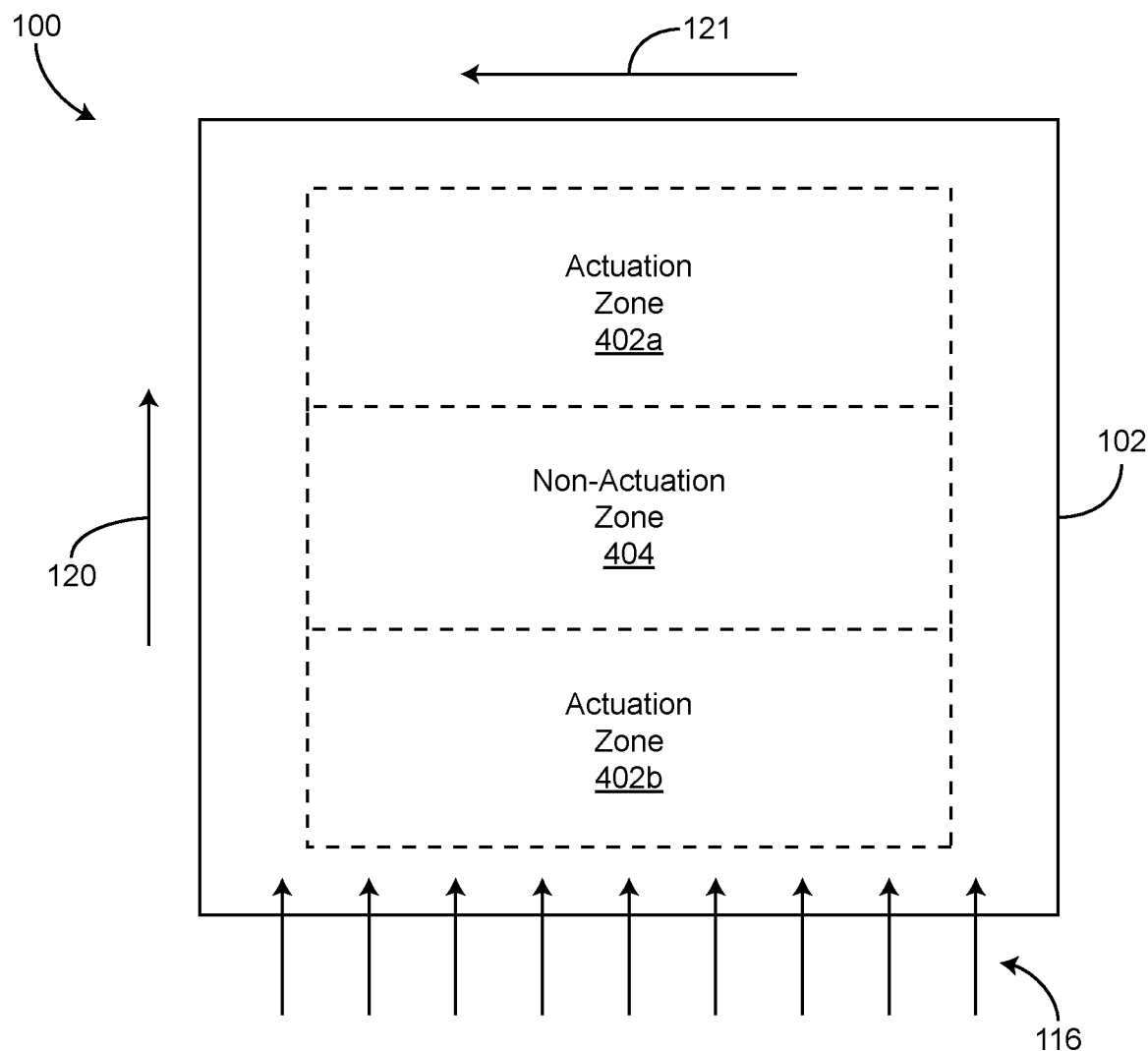
FIG. 4 is a top view of a surface of the fluid control system of FIG. 1 with actuation and non-actuation zones, according to an embodiment of the present disclosure.
Figure 5:
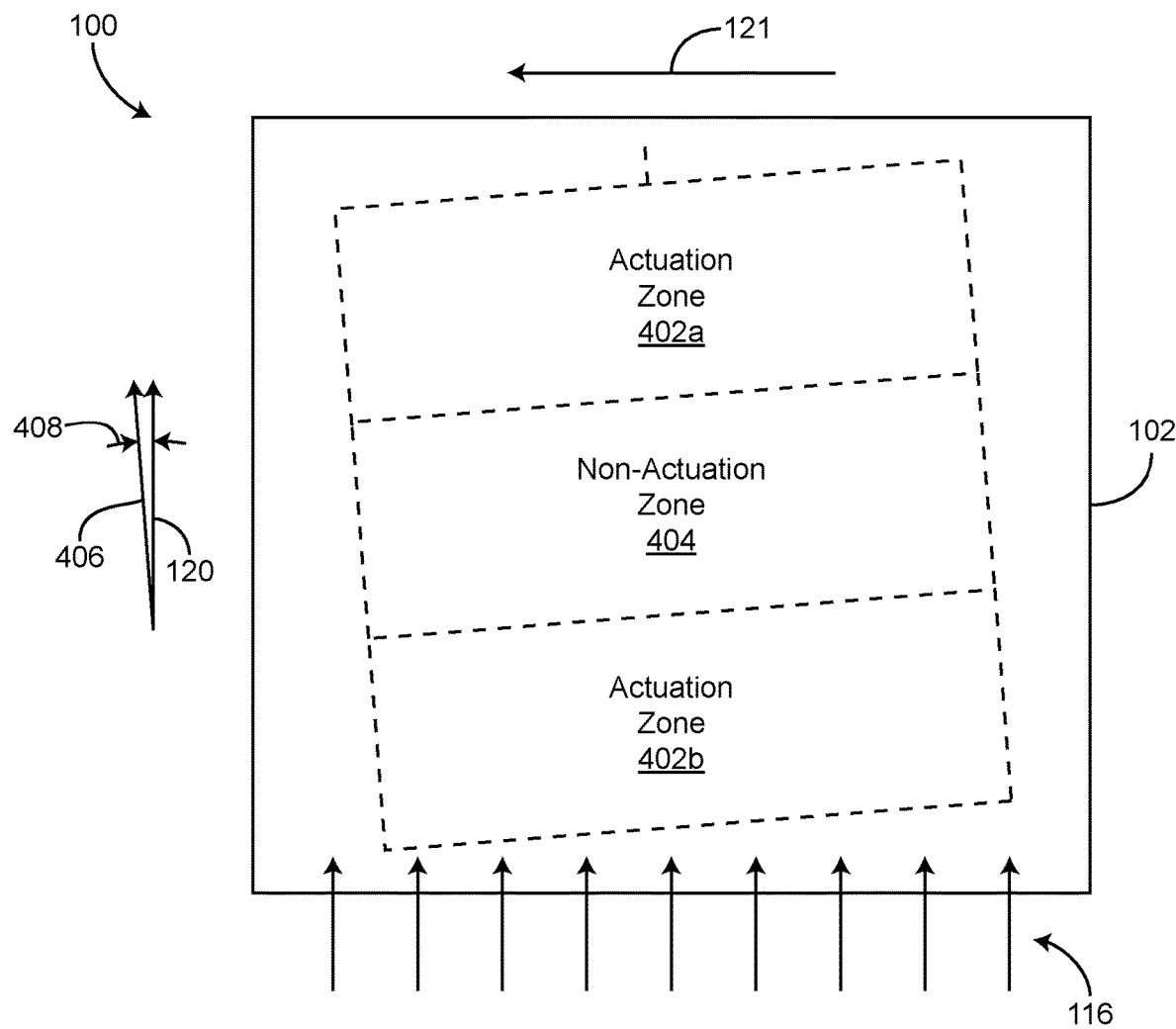
FIG. 5 is a top view of a surface of the fluid control system of FIG. 1 with actuation and non-actuation zones arranged at an angle, according to an embodiment of the present disclosure.

Referring particularly to FIGS. 4-5, surface 102 may include one or more movable areas, actuatable areas, translatable areas, adjustable areas, zones, etc., shown as first actuation zone 402a and second actuation zone 402b. The actuation zones 402 can be spaced a predetermined distance apart along the surface 102 (e.g., a distance between 10 mm and 50 mm). Surface 102 can also include a non-actuation zone 404. The first actuation zone 402a and the second actuation zone 402b may include or be made up of movable or deformable sections. For example, the first actuation zone 402a may include or be defined by multiple adjustable sections 101. Likewise, the second actuation zone 402b may include or be defined by multiple adjustable sections 101. These sections may differ in size, shape, and actuation parameters based on local flow conditions, such as the length and/or time scales described in Equation 1 above. In some embodiments, a size, spacing, orientation, shape, etc., of the actuation zones 402 and the non-actuation zones 404 are based on an expected parameter of the fluid 116. Similarly, the size, spacing, orientation, or shape of the non-actuation zone 404 or the actuation zones 402 can vary based on a spanwise or streamwise position of the non-actuation zone 404 or the actuation zones 402 relative to a start of a boundary layer of the fluid 116. The size, spacing, orientation, or shape of the actuation zones 402 and/or the non-actuation zones 404 can be based on a convective time scale of the fluid 116.

Each adjustable section 101 of the first actuation zone 402a and the second actuation zone 402b may include a corresponding actuator 110. Controller 104 can be configured to generate control signals for each actuator 110 of the multiple adjustable sections 101 of the first actuation zone 402a and the second actuation zone 402b to control the parameter of the fluid 116.

After one or more of adjustable sections 101 are translated or deformed by actuator 110 (e.g., increased in elevation, decreased in elevation, etc.), the fluid 116 may recover or change flow structure over time (e.g., the parameter of the fluid 116 changes). For instance, the actuation of zone 402a may disrupt turbulent eddies in the fluid 116 of a particular size or period. The energy from these may take some time to dissipate, allowing the fluid to flow with reduced drag over the surface. Similar eddies may eventually re-form and re-establish the initial flow structure, but the time this takes may be significant relative to the time the fluid spends over the initial actuation zone 402a. Based on this recovery time of fluid 116, actuation of adjustable sections 101 may not need to be continuous across surface 102. As mentioned above, the parameter of the fluid 116 may be controlled by moving adjustable sections 101 with actuator(s) 110. In order to achieve the desired value of the parameter of the fluid 116, intermittent adjustment or motion of only some adjustable sections 101 may be sufficient and may reduce power consumption of fluid control system 100 compared to actuation of the entire surface 102.

As shown in FIG. 4, the first actuation zone 402a, non-actuation zone 404, and second actuation zone 402b are aligned in the streamwise direction 120. As fluid 116 flows over surface 102, the fluid 116 may first flow over first actuation zone 402a where the parameter of the fluid 116 is controlled. The fluid 116 may then flow over non-actuation zone 404. After the fluid passes over non-actuation zone 404, the fluid may flow over second actuation zone 402b, where the parameter of fluid 116 is again controlled. It should be understood that while surface 102 is shown to include a single non-actuation zone 404 and two actuation zones 402, surface 102 may include more or less than two actuation zones 402, and more or less than a single non-actuation zone 404. The various actuation zones 402 and non-actuation zones 404 may be arranged in any direction (e.g., in the streamwise direction 120 as shown in FIG. 4, along a direction 406 that is offset by an angle 406 relative to streamwise direction 120 as shown in FIG. 5, in the spanwise direction 121, etc.).

Controller 104 generates control signals for the actuators 110 of the various actuation zones 402 (e.g., the first actuation zone 402a and the second actuation zone 402b) to control the parameter of the fluid 116 as the fluid passes over surface 102. Advantageously, using both actuation zones 402 and non-actuation zone 404 facilitates reduced power consumption of fluid control system 100, reduced weight of fluid control system 100 (e.g., by reducing an amount of actuators 110 required to achieve the desired value of the parameter of the fluid 116), and improved overall cost of fluid control system 100.

Figure 10:
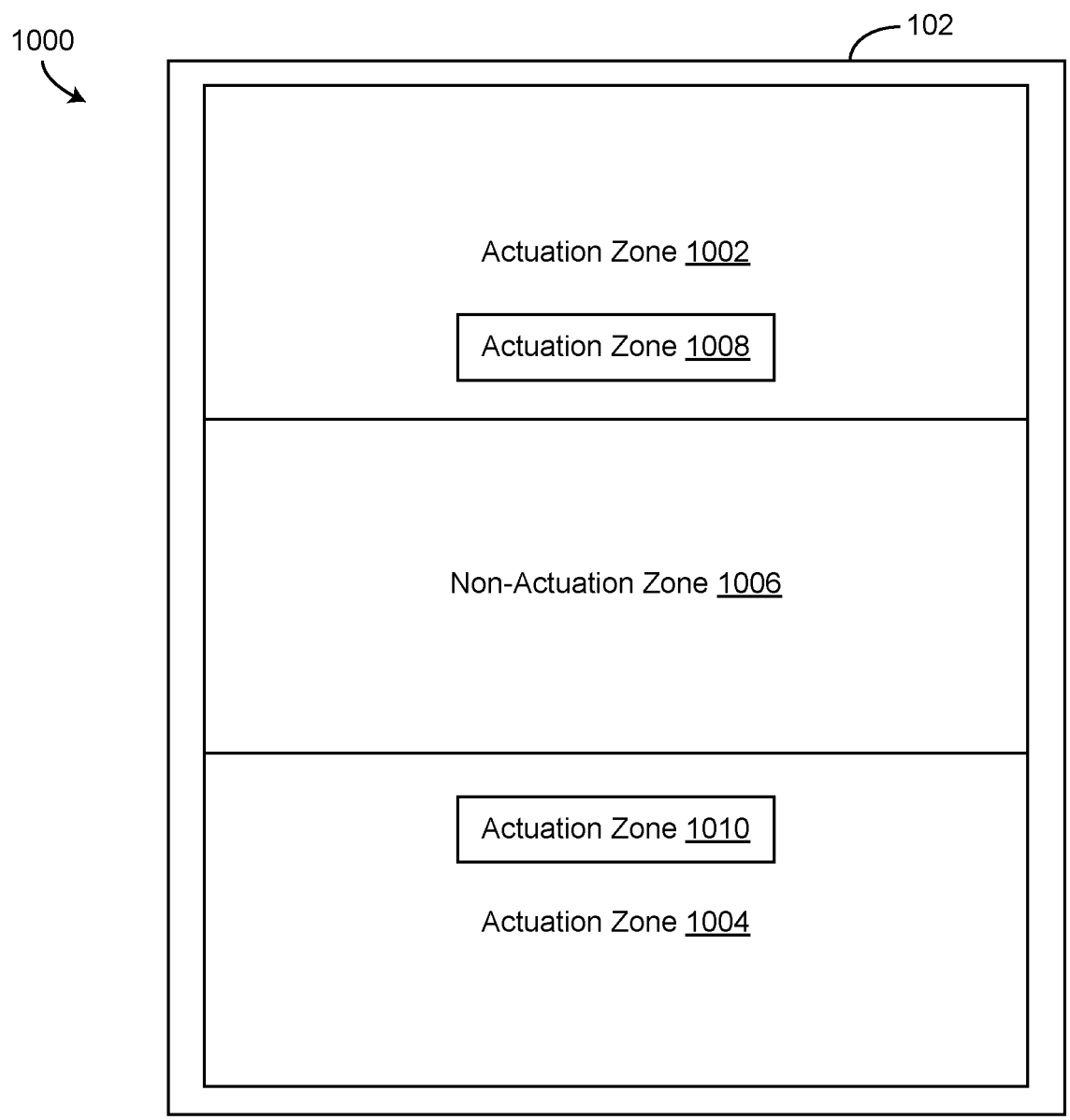
FIG. 10 is a diagram showing different actuation and non-actuation zones of a surface, according to an embodiment of the present disclosure.

Referring particularly to FIG. 10, another configuration 1000 includes one or more nested actuation zones 1008 and 1010 that are nested within an actuation zone 1002 and 1004, respectively. In some embodiments, the nested actuation zones 1008 and 1010 that are nested within the actuation zones 1002 and 1004, respectively, are actuated (e.g., through the use of actuators arranged according to any of the configurations described herein) differently (e.g., according to different actuation parameters). Advantageously, such a nested configuration can reduce power consumption of the fluid control system 100 and/or to improve performance of the fluid control system 100 by adjusting parameters of the flow of the fluid 116 that may be adversely affected by initial actuation. For example, fluid flowing over the actuation zone 1002 may have eddies of a particular size that can be disrupted by actuation of the actuation zone 1002. However, the energy from these eddies may propagate into other parts of the fluid 116 at different length or time scales (see n above) causing additional drag. This additional drag can be affected (or mitigated) by the nested actuation zone 1008 that is nested within the actuation zone 1002. Similarly, the actuation zone 1004 can include the nested actuation zone 1010 which is tuned (e.g., includes actuation parameters tuned) to match the different length or time scales in local areas. In some embodiments, the nested actuation zones 1010 and/or 1008 can be oriented parallel, perpendicular, or at any intermediate angle relative to a flow of the fluid 116 and/or relative to the actuation zone 1004 or the actuation zone 1002. Each of the different nested actuation zones 1010 and/or 1008, and/or the actuation zones 1004 and/or 1002 can include corresponding or different sets of actuation parameters. The determination, adjustment, or use of these actuation parameters can be performed by the controller 104 (e.g., based on values of one or more local flow parameters of the fluid 116).

Referring again to FIG. 4, first actuation zone 402a may be operated by controller 104 based on sensor feedback (e.g., using values of the parameter as obtained by the sensor 118) and/or based on a corresponding set of one or more actuation parameters to react to local flow patterns of fluid 116 at first actuation zone 402a. Second actuation zone 402b may be the same as or similar to first actuation zone 402a or may be adjusted or operated by controller 104 differently (e.g., using a different set of one or more actuation parameters) to match local flow positions.

In some embodiments, the actuation parameters of any particular actuation zone (e.g., first actuation zone 402a, second actuation zone 402b, actuation zone 1002, actuation zone 1004, nested actuation zone 1008, or nested actuation zone 1010) can be varied with time. For example, based on sensor feedback from the sensor 118, it may be advantageous to slow a frequency of actuation of an actuation zone from a first value to a second value over a period of time as a parameter of the fluid 116 changes over time. This may include starting or stopping a frequency of operation of a specific actuation zone at a particular rate, matched to a changing length or time scale of a particular variation in the flow of the fluid 116. Adjusting a surface topology of the actuation zones (e.g., the first actuation zone 402a, the second actuation zone 402b, the actuation zone 1002, the actuation zone 1004, the nested actuation zone 1008, the nested actuation zone 1010, etc.) in combination with surface topology of one or more non-actuation zones (e.g., non-actuation zone 404, non-actuation zone 1006, etc.) may adjust an overall surface topology of the surface 102.

Figure 3:
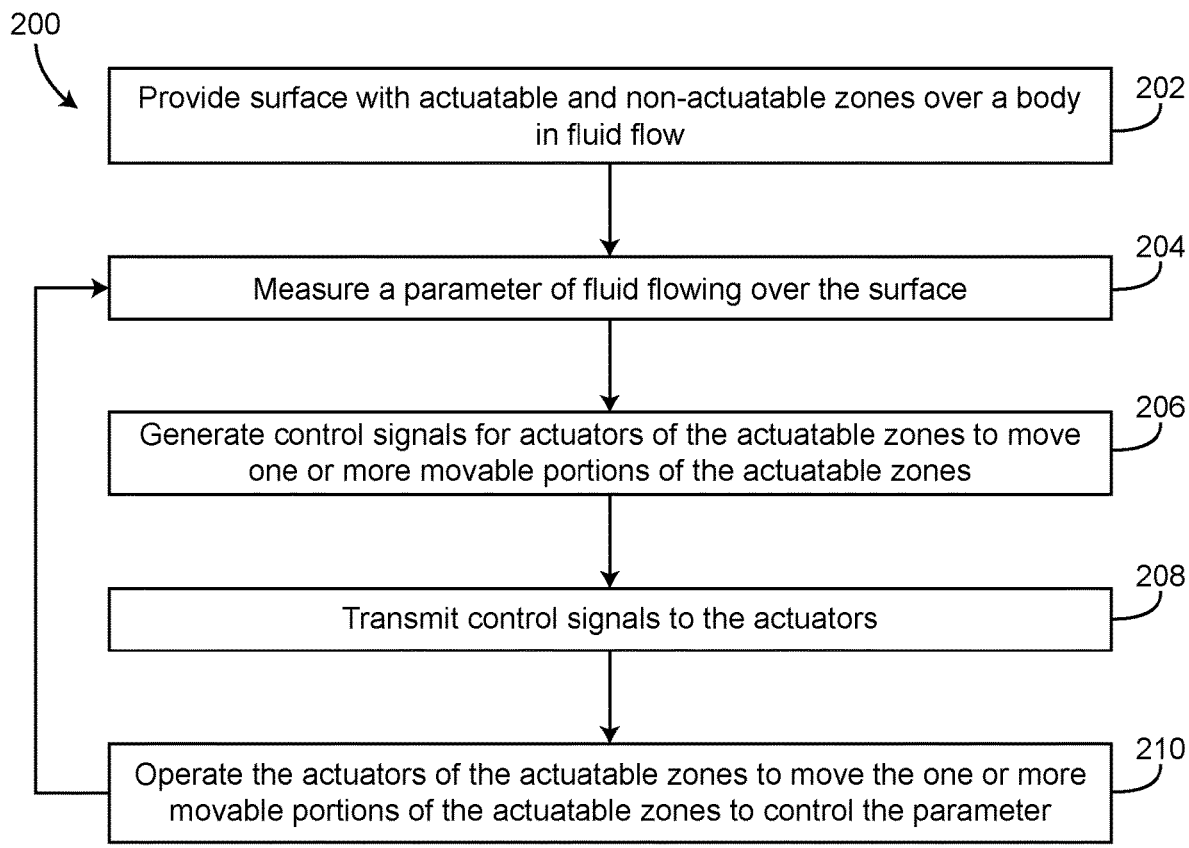
FIG. 3 is a flow diagram of a method for active control of surface drag, according to an embodiment of the present disclosure.

Referring particularly to FIG. 3, a flow diagram of a process 200 for controlling a parameter of a flowing fluid over a surface is shown, according to some embodiments. Process 200 includes steps 202-210 and may be performed by fluid control system 100 using actuators 110. Process 200 can be performed by fluid control system 100 to control a parameter of fluid 116 or to reduce a drag or surface shear stress of surface 102. Process 200 may include controlling, moving, actuating, etc., actuators 110 of one or more actuation zones 402 to translate or move a portion of surface 102 to control the parameter of fluid 116 that flows over surface 102 or to reduce drag of surface shear stress of surface 102.

Process 200 includes providing a surface with actuatable and non-actuatable zones over a body in fluid flow (step 202), according to some embodiments. The surface may be surface 102 and can include multiple actuatable and non-actuatable zones that may include translatable, movable, or deformable sections that can be adjusted to control a parameter of the fluid that flows over the surface. The actuatable zones may be defined by one or more adjustable or movable sections that can be moved or actuated by an actuator. The actuatable zones and non-actuatable zones may be arranged in a streamwise direction or at an angle offset from the streamwise direction (e.g., at least partially along a spanwise direction). The non-actuatable zones may have fixed or non-adjustable surface topology.

Process 200 includes measuring a parameter of fluid flowing over the surface (step 204), according to some embodiments. The parameter may be any fluid property of the fluid that flows over the surface. For example, the parameter may indicate an amount of drag or surface shear stress between the surface and the fluid flowing over the surface. In some embodiments, the parameter of fluid flowing over the surface is measured by sensor 118. Sensor 118 may measure the parameter or property of the fluid directly and provide the measured parameter to controller 104. In other embodiments, sensor 118 measures one or more properties of the fluid that flows over the surface which can be used by controller 104 to calculate the parameter of the fluid.

Process 200 includes generating control signals for one or more actuators of the actuatable zones to move one or more movable portions of the actuatable zones to control the parameter of the fluid (step 206), according to some embodiments. Step 206 may include using the parameter to determine a distance that each actuator should be translated or a change in surface topology of the actuatable zones to control the parameter. The control signals may include an amount that each movable section or actuator should be moved to control the parameter of the fluid as desired or so that the parameter of the fluid achieves a desired value. Step 206 can be performed by controller 104. The various movable sections or actuators of the actuatable zones may be independently controlled by controller 104.

Process 200 includes transmitting the control signals to the actuators (step 208), according to some embodiments. Transmitting the control signals to the actuators may include providing the signals using a wired or wireless connection between the controller 104 and the actuators 110. Providing the control signals to the actuators may transition the actuators between different heights to control the parameter of the fluid at the first actuation zone 402a and/or the second actuation zone 402b. Step 208 may be performed by controller 104.

Process 200 includes operating the actuators to move the one or more movable portions of the actuatable zones to control the parameter (step 210), according to some embodiments. Step 210 may include receiving the control signals at the actuators (e.g., at multiple of actuators 110) and using the control signals to move, adjust, increase a height, decrease a height, change a surface topology, deform, etc., the one or more movable portions of the actuatable zones to control the parameter of the fluid. In some embodiments, step 210 is performed by actuators 110.

Figure 11:
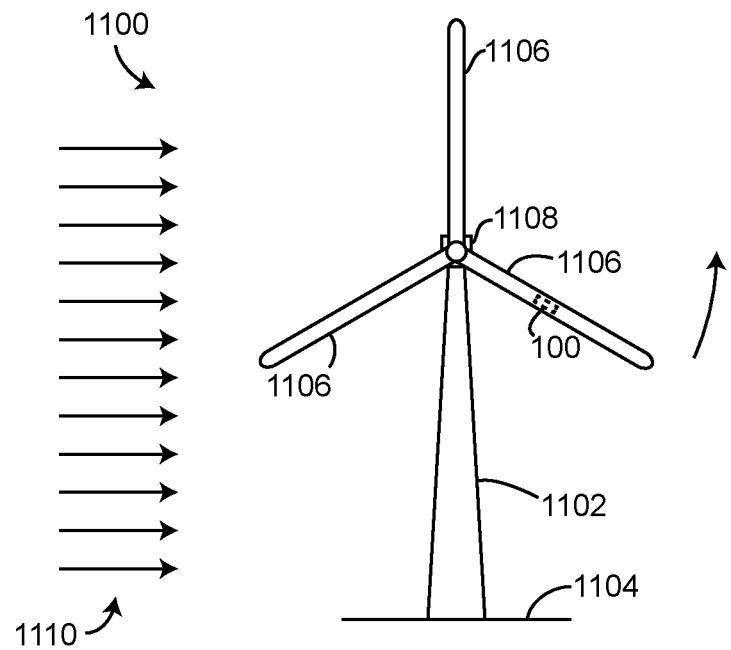
FIG. 11 is a diagram of a wind turbine in which the fluid control systems or method of FIGS. 1-10 can be implemented, according to some embodiments.
Figure 12:
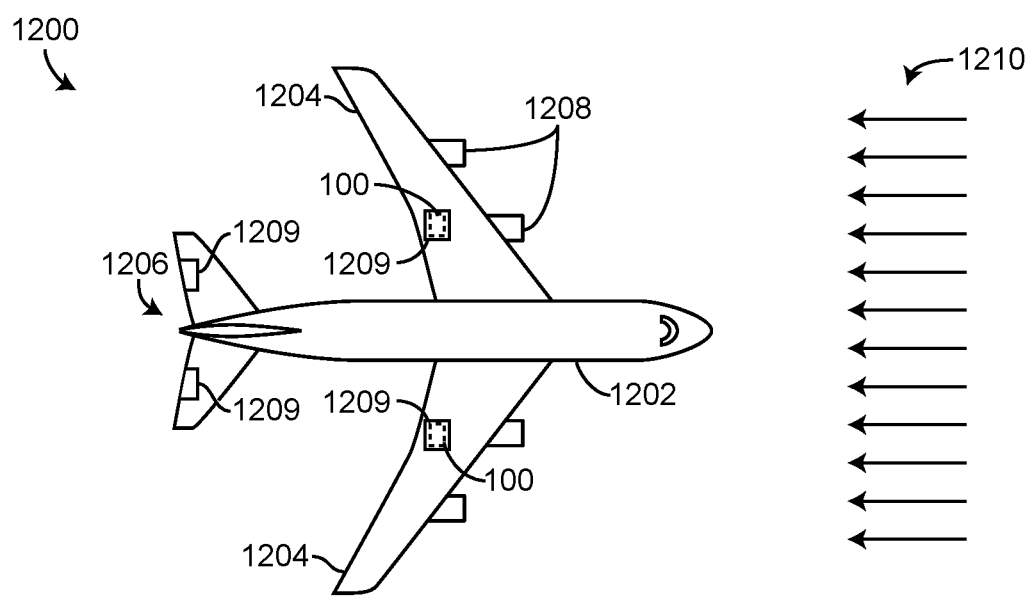
FIG. 12 is a diagram of an aircraft in which the fluid control systems or method of FIGS. 1-10 can be implemented, according to some embodiments.

Referring to FIGS. 11-12, different implementations of the fluid control system 100 are shown, according to exemplary embodiments. The fluid control system 100 can be implemented or used on a wind turbine 1100 or an aircraft 1200. For example, referring particularly to FIG. 11, the wind turbine 1100 can include a base 1102 that is anchored with a ground surface 1104, multiple turbine blades 1106, and a nacelle 1108. The wind turbine 1100 can also include a generator and can be configured to generate electricity from mechanical energy of the turbine blades 1106 as the turbine blades 1106 are driven by a wind 1110 (e.g., a fluid) to rotate relative to the nacelle 1108. The fluid control system 100 can be positioned along any of or multiple of the turbine blades 1106. The fluid control system 100 can implement the techniques described herein to facilitate improved rotation of the turbine blades 1106 relative to the nacelle 1108, thereby facilitating improved electricity generation.

Similarly, referring particularly to FIG. 12, the aircraft 1200 can be an airplane, a helicopter, a jet, etc. The aircraft 1200 may include one or more wings 1204, a fuselage 1202 from which the wings 1204 extend, tail stabilizers 1206, one or more flight control surfaces 1209 (e.g., rudders, ailerons, elevators, flaps) and multiple jet engines 1208. The wings 1204 can provide lift for the aircraft 1200 when air 1210 passes across the wings 1204. The fluid control system 100 can be positioned at a position along one or both of the wings 1204, or at multiple locations along both the wings 1204, or at multiple locations along one of the wings 1204. As the wings 1204 pass through the air 1210, the fluid control system 100 can operate to reduce drag, thereby improving efficiency of the aircraft 1200.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fluid control systems and methods of fluid control as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A fluid control system, comprising:
   a surface comprising:
      one or more non-actuating zones over which a fluid flows, and
      one or more actuatable zones over which the fluid flows;
   an actuator in the actuatable zone of the surface to inject momentum in-plane with the surface, wherein the actuator is positioned within the actuatable zone for actuation:
      in-plane with respect to the surface, and
      in a spanwise direction with respect to a direction of the fluid flow over the surface; and
   processing circuitry to:
      obtain a value of a parameter of the fluid; and
      operate the actuator to inject momentum into the fluid in the spanwise direction to change a flow property of the fluid based on the obtained value of the parameter of the fluid.

2. The system of claim 1, wherein the flow property is at least one of a flow rate, a velocity, a momentum, a transverse momentum, a shear stress, a velocity profile, a velocity gradient, or a skin-friction coefficient of the fluid.

3. The system of claim 1, wherein the one or more actuatable zones are spaced a predetermined distance apart along the surface.

4. The system of claim 3, wherein the predetermined distance is between 10 mm and 50 mm.

5. The system of claim 1, wherein at least one of a size, spacing, orientation, or shape of the non-actuating zones and the actuatable zones of the surface are based on a parameter of the fluid.

6. The system of claim 1, wherein at least one of a size, spacing, orientation, or shape of the non-actuating zones and the actuatable zones of the surface are based on a spanwise or streamwise position of the non-actuating zones or the actuatable zones relative to a start of a boundary layer of the fluid.

7. The system of claim 1, wherein at least one of a size, spacing, orientation, or shape of the non-actuating zones and the actuatable zones of the surface are based on a convective time scale of the fluid.

8. The system of claim 7, wherein the convective time scale has a value between $10\eta'$ and $10,000\eta'$, where $\eta'$ is a viscous time scale of a flow regime of the fluid.

9. The system of claim 1, wherein the actuator comprises at least one of:
   a dielectric-barrier discharge (DBD) device; or
   a motion of the surface.

10. The system of claim 1, wherein the actuator is further configured to change a surface topology of the one or more actuatable zones.

11. The system of claim 1, further comprising one or more sensors, wherein the processing circuitry is further configured to operate the actuator of the one or more actuatable zones to change the flow property of the fluid based on one or more local flow parameters of the fluid and one or more sensor inputs from the one or more sensors.

12. The system of claim 1, wherein the processing circuitry is further configured to operate the actuator to change the flow property of the fluid flowing over the one or more actuatable zones according to one or more actuation parameters.

13. The system of claim 12, wherein the processing circuitry is further configured to change the one or more actuation parameters over time at a rate of change based on one or more local flow parameters of the fluid.

14. A method for controlling a property of a fluid, the method comprising:
   providing a surface comprising one or more actuatable zones and one or more non-actuating zones;
   obtaining a value of a parameter of a fluid that flows over the one or more actuatable zones; and
   operating, based on the value of the parameter of the fluid, an actuator to change a flow property of the fluid that flows over the one or more actuatable zones, the actuator operable to cause a motion of the surface that is:
      in-plane with respect to the surface, and
      in a direction streamwise or spanwise with respect to the direction of fluid flow over the surface.

15. The method of claim 14, wherein the flow property is at least one of a flow rate, a velocity, a momentum, a transverse momentum, a shear stress, a velocity profile, a velocity gradient, or a skin-friction coefficient of the fluid.

16. The method of claim 14, wherein the one or more actuatable zones of the surface are spaced a predetermined distance apart along the surface.

17. The method of claim 16, wherein the predetermined distance is between 10 mm and 50 mm.

18. The method of claim 14, wherein any of a size, spacing, orientation, or shape of the non-actuating zones and the actuatable zones of the surface are based on a parameter of the fluid.

19. The method of claim 14, wherein any of a size, spacing, orientation, or shape of the non-actuating zones and the actuatable zones of the surface are based on a spanwise or streamwise position of the non-actuating zones or the actuatable zones relative to a start of a boundary layer of the fluid.

20. The method of claim 14, wherein any of a size, spacing, orientation, or shape of the non-actuating zones and the actuatable zones of the surface are based on a convective time scale of the fluid.

21. The method of claim 20, wherein the convective time scale has a value between $10\eta'$ and $10,000\eta'$, where $\eta'$ is a viscous time scale of a flow regime of the fluid.

22. The method of claim 14, wherein the actuator comprises at least one of:
   a dielectric-barrier discharge (DBD) device; or
   a motion of the surface.

23. The method of claim 14, wherein the actuator is further configured to change a surface topology of the one or more actuatable zones.

24. The method of claim 14, further comprising obtaining one or more sensor inputs from one or more sensors, and operating the actuator to change the flow property of the fluid based on one or more local flow parameters of the fluid and the one or more sensor inputs from the one or more sensors.

25. The method of claim 14, further comprising operating the actuator to change the flow property of the fluid flowing over the one or more actuatable zones according to one or more actuation parameters.

26. The method of claim 25, further comprising changing the one or more actuation parameters over time at a rate of change based on one or more local flow parameters of the fluid.

27. The method of claim 26, wherein the rate of change of the one or more actuation parameters is based on a rate of change of the one or more local flow parameters of the fluid.

28. A wind turbine comprising:
a plurality of turbine blades;
a base to support the turbine blades, wherein the turbine blades are configured to rotate relative to the base as a fluid flows across the plurality of turbine blades; and
a fluid control system positioned on at least one of the turbine blades, the fluid control system comprising:
an actuator to change a flow property of a fluid that flows over one or more actuatable zones of a surface, wherein the actuator is configured to be actuated:
in-plane with respect to the surface, and
transverse with respect to the direction of fluid flow; and
processing circuitry to:
obtain a value of a parameter of the fluid; and
operate the actuator to change the flow property of the fluid based on the value of the parameter of the fluid.

29. The wind turbine of claim 28, wherein the flow property is at least one of a flow rate, a velocity, a momentum, a transverse momentum, a shear stress, a velocity profile, a velocity gradient, or a skin-friction coefficient of the fluid.

30. The wind turbine of claim 28, wherein at least one of a size, spacing, orientation, or shape of one or more non-actuating zones of the surface and the actuatable zones of the surface are based on a convective time scale of the fluid, wherein the convective time scale has a value between $10\eta'$ and $10,000\eta'$, where $\eta'$ is a viscous time scale of a flow regime of the fluid.

31. An aircraft comprising:
a fuselage;
a component comprising at least one of a wing or a flight control surface coupled with the fuselage; and
a fluid control system positioned on a surface of at least one of the fuselage or the component, the fluid control system comprising:
an actuator to change a flow property of a fluid that flows over one or more actuatable zones of the fuselage or the component by an actuation that is:
in-plane with respect to the surface, and
transverse to the direction of fluid flow; and
processing circuitry to:
obtain a value of a parameter of the fluid; and
operate the actuator to change the flow property of the fluid based on the value of the parameter of the fluid.

32. The aircraft of claim 31, wherein the flow property is at least one of a flow rate, a velocity, a momentum, a transverse momentum, a shear stress, a velocity profile, a velocity gradient, or a skin-friction coefficient of the fluid.

33. The aircraft of claim 31, wherein at least one of a size, spacing, orientation, or shape of one or more non-actuating zones of a surface of the fuselage or the component and the actuatable zones of the surface are based on a convective time scale of the fluid, wherein the convective time scale has a value between $10\eta'$ and $10,000\eta'$, where $\eta'$ is a viscous time scale of a flow regime of the fluid.

* * * * *